(12) United States Patent
Damon et al.

(10) Patent No.: US 11,179,226 B2
(45) Date of Patent: Nov. 23, 2021

(54) ORTHODONTIC BRACKET

(71) Applicant: Premier Orthodontic Designs, LLLP, Carson City, NV (US)

(72) Inventors: Paul L. Damon, Spokane, WA (US); Dwight H. Damon, Spokane, WA (US)

(73) Assignee: Premier Orthodontic Designs LLLP, Carson City, NV (US)

( * ) Notice: Subject to any disclaimer, the term of this patent is extended or adjusted under 35 U.S.C. 154(b) by 0 days.

(21) Appl. No.: 15/271,894

(22) Filed: Sep. 21, 2016

(65) Prior Publication Data

US 2017/0172708 A1    Jun. 22, 2017

Related U.S. Application Data

(63) Continuation-in-part of application No. 14/976,074, filed on Dec. 21, 2015, now Pat. No. 11,116,607.

(51) Int. Cl.
*A61C 7/28* (2006.01)
*A61C 7/14* (2006.01)

(52) U.S. Cl.
CPC ............... *A61C 7/287* (2013.01); *A61C 7/14* (2013.01)

(58) Field of Classification Search
CPC .. A61C 7/12; A61C 7/125; A61C 7/14; A61C 7/141; A61C 7/143; A61C 7/145; A61C 7/146; A61C 7/148; A61C 7/16; A61C 7/18; A61C 7/20; A61C 7/22; A61C 7/28; A61C 7/282; A61C 7/285; A61C 7/287
USPC ............................................................ 433/8
See application file for complete search history.

(56) References Cited

U.S. PATENT DOCUMENTS

| 5,030,089 A | 7/1991 | Kawaguchi |
| 5,464,347 A * | 11/1995 | Allesee ............ A61C 7/14 433/16 |
| 5,908,293 A | 6/1999 | Voudouris |
| 6,168,428 B1 | 1/2001 | Voudouris |
| 6,368,105 B1 * | 4/2002 | Voudouris ........... A61C 7/282 433/11 |

(Continued)

FOREIGN PATENT DOCUMENTS

| AU | 5016399 A | 3/2000 |
| CN | 105473079 A | 4/2016 |

(Continued)

OTHER PUBLICATIONS

European Patent Office, extended European Search Report in corresponding European Patent Application No. 16879523.5 dated Jul. 23, 2019.

(Continued)

*Primary Examiner* — Heidi M Eide
*Assistant Examiner* — Drew S Folgmann
(74) *Attorney, Agent, or Firm* — Wood Herron & Evans LLP

(57) ABSTRACT

An orthodontic bracket is described and which includes an archwire slot for receiving and cooperating with an archwire having a given shape, and wherein the bracket body has multiple forms each having an immovable anterior facing surface which lies in a given plane, and wherein the various forms of the bracket body can be rendered operable to express first, second or third order movement to a patient's tooth undergoing a clinician directed orthodontic treatment.

25 Claims, 10 Drawing Sheets

(56) References Cited

U.S. PATENT DOCUMENTS

| | | | |
|---|---|---|---|
| 7,431,586 B1 | 10/2008 | Silverman | |
| 9,198,740 B2 | 12/2015 | Damon | |
| 2004/0086825 A1* | 5/2004 | Lai | A61C 7/30 |
| | | | 433/11 |
| 2004/0214128 A1 | 10/2004 | Sachdeva et al. | |
| 2005/0158686 A1* | 7/2005 | Wiechmann | A61C 7/002 |
| | | | 433/8 |
| 2006/0154196 A1 | 7/2006 | Oda | |
| 2006/0172249 A1* | 8/2006 | Lai | A61C 7/28 |
| | | | 433/11 |
| 2009/0298003 A1* | 12/2009 | Wei | A61C 7/287 |
| | | | 433/9 |
| 2010/0178629 A1* | 7/2010 | Oda | A61C 7/125 |
| | | | 433/14 |
| 2010/0304321 A1* | 12/2010 | Patel | A61C 7/20 |
| | | | 433/9 |
| 2011/0270583 A1 | 11/2011 | Getto et al. | |
| 2012/0107760 A1 | 5/2012 | Eichenberg | |
| 2012/0122050 A1 | 5/2012 | Bathen et al. | |
| 2012/0276496 A1 | 11/2012 | Bathen et al. | |
| 2014/0272751 A1 | 9/2014 | Cosse et al. | |
| 2015/0050612 A1 | 2/2015 | Damon et al. | |

FOREIGN PATENT DOCUMENTS

| | | | |
|---|---|---|---|
| JP | 2009535174 A | 10/2009 | |
| JP | 2011025070 A | 2/2011 | |
| JP | 2012065897 A | 4/2012 | |
| JP | 2014094288 A | 5/2014 | |
| RU | 114840 U1 | 4/2012 | |
| WO | 2009078031 A1 | 6/2009 | |
| WO | 2015026400 A2 | 2/2015 | |

OTHER PUBLICATIONS

International Bureau of WIPO, International Preliminary Report on Patentability in corresponding International Patent Application No. PCT/US2017/044310, dated Mar. 26, 2019.
Notification of Transmittal of International Preliminary Report on Patentability, PCT/US16/45508, dated Jan. 16, 2018.
International Preliminary Report on Patentability, PCT/US16/45508.
Folgmann, Drew S, Office Action, U.S. Appl. No. 14/976,074 , dated Jul. 25, 2017.
Notification of Transmittal of the International Search Report and the Written Opinion of the International Searching Authority, or the Declaration, PCT/US17/44310, dated Aug. 16, 2017.
New Zealand Intellectual Property Office, Office Action in corresponding New Zealand Patent Application No. 739415 dated Nov. 2, 2018.
Australian Patent Office, Office Action in corresponding Australian Patent Application No. 2016375591 dated Dec. 10, 2018.
U.S. Patent and Trademark Office, Office Action in corresponding U.S. Appl. No. 14/976,074 dated Oct. 24, 2018.
Canadian Patent Office, Office Action in corresponding Canadian Application No. 2,994,283 dated Jun. 6, 2018.
Russian Patent Office, Official Action issued in RU 2019111709 dated Feb. 17, 2020.
Russian Patent Office, Search Report issued in RU 2019111709 dated Feb. 17, 2020.
Major et al., "Investigation into the Mechanical Characteristics of Select Self-Litigated Brackets at a Series of Clinically Relevant Maximum Torquing Angles: Loading and Unloading Curves and Bracket Deformation ", European Journal of Orthodontics, vol. 35, Issue 6, Dec. 2013, pp. 719-729.
European Patent Office, Partial Search Report issued in EP17853594.4 dated May 18, 2020.
Russian Patent Office, Decision to Grant issued in RU 2019111709 dated Jul. 23, 2020.
Korean Patent Office, Decision of Rejection issued in KR 10-2018-7003019 dated Jul. 30, 2020.
European Patent Office, Extended Search Report issued in EP 17853594.4 dated Aug. 9, 2020.
Chinese Patent Office, Office Action issued in CN201780057979.8 dated Sep. 23, 2020.
Japanese Patent Office, Office Action issued in JP 2019-536812 dated Nov. 24, 2020.
Japanese Patent Office, Decision of Rejection issued in JP 2019-536812 dated May 25, 2021.
Chinese Patent Office, Office Action issued in CN201780057979.8 dated Jun. 24, 2021.

* cited by examiner

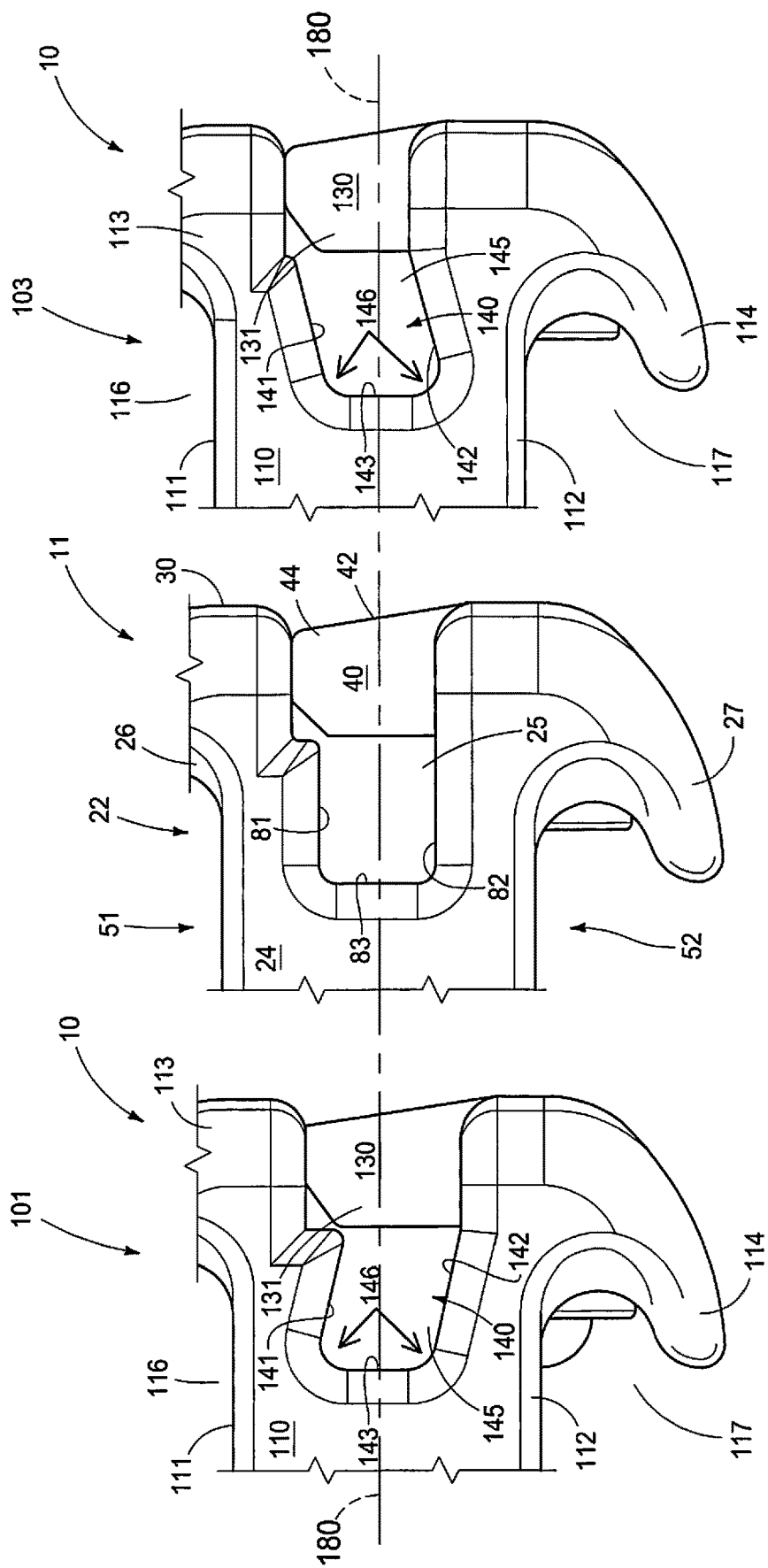

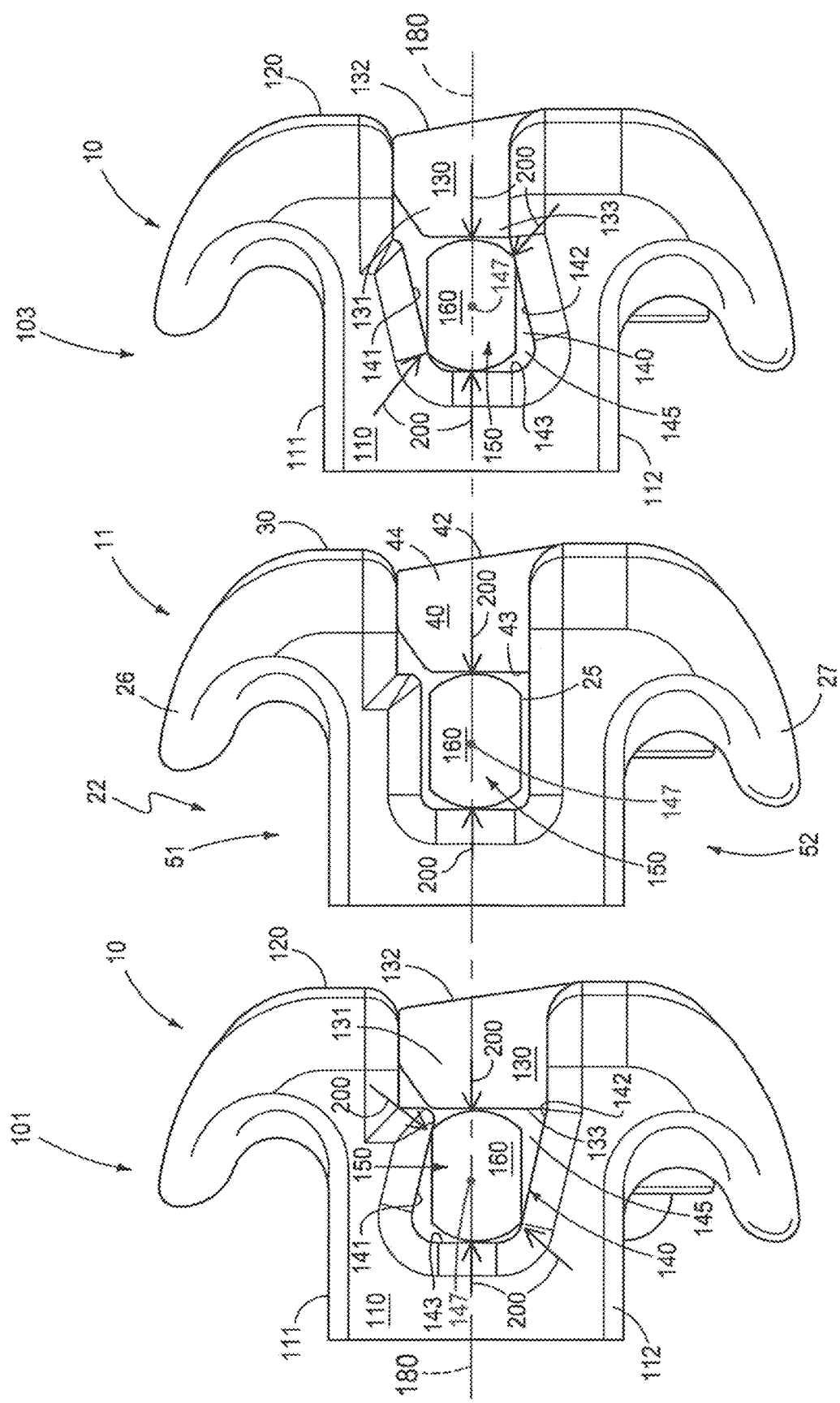

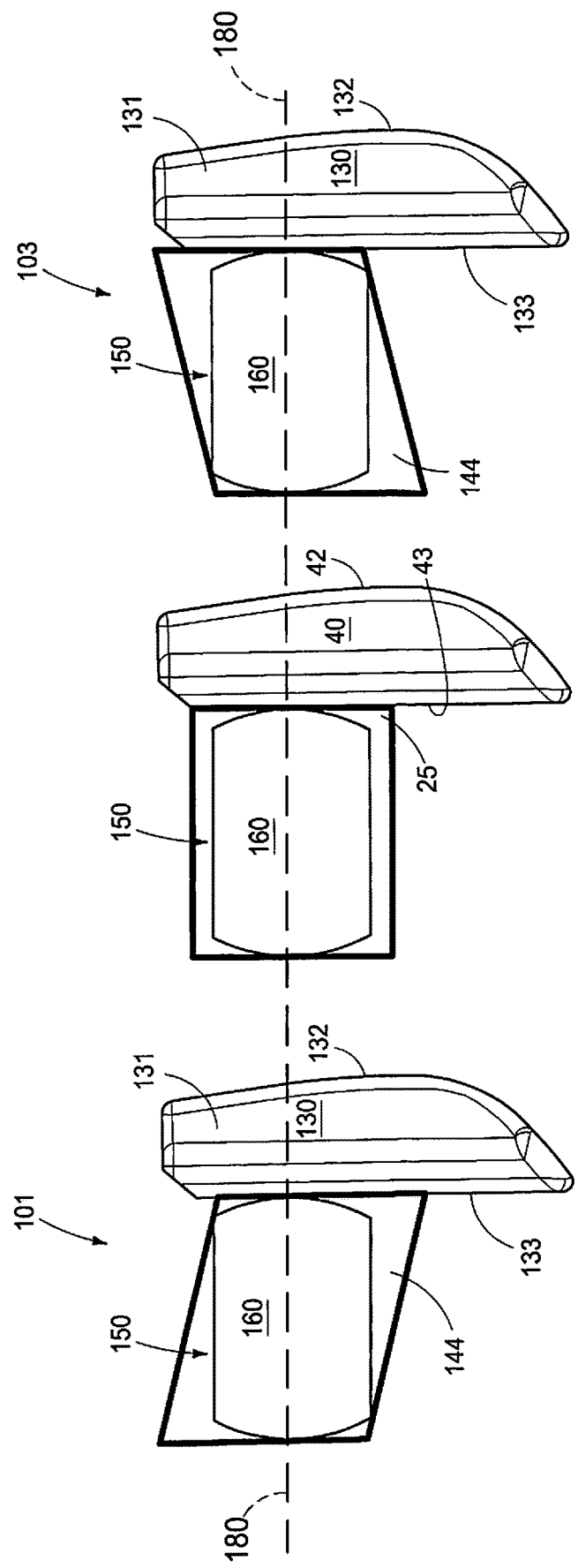

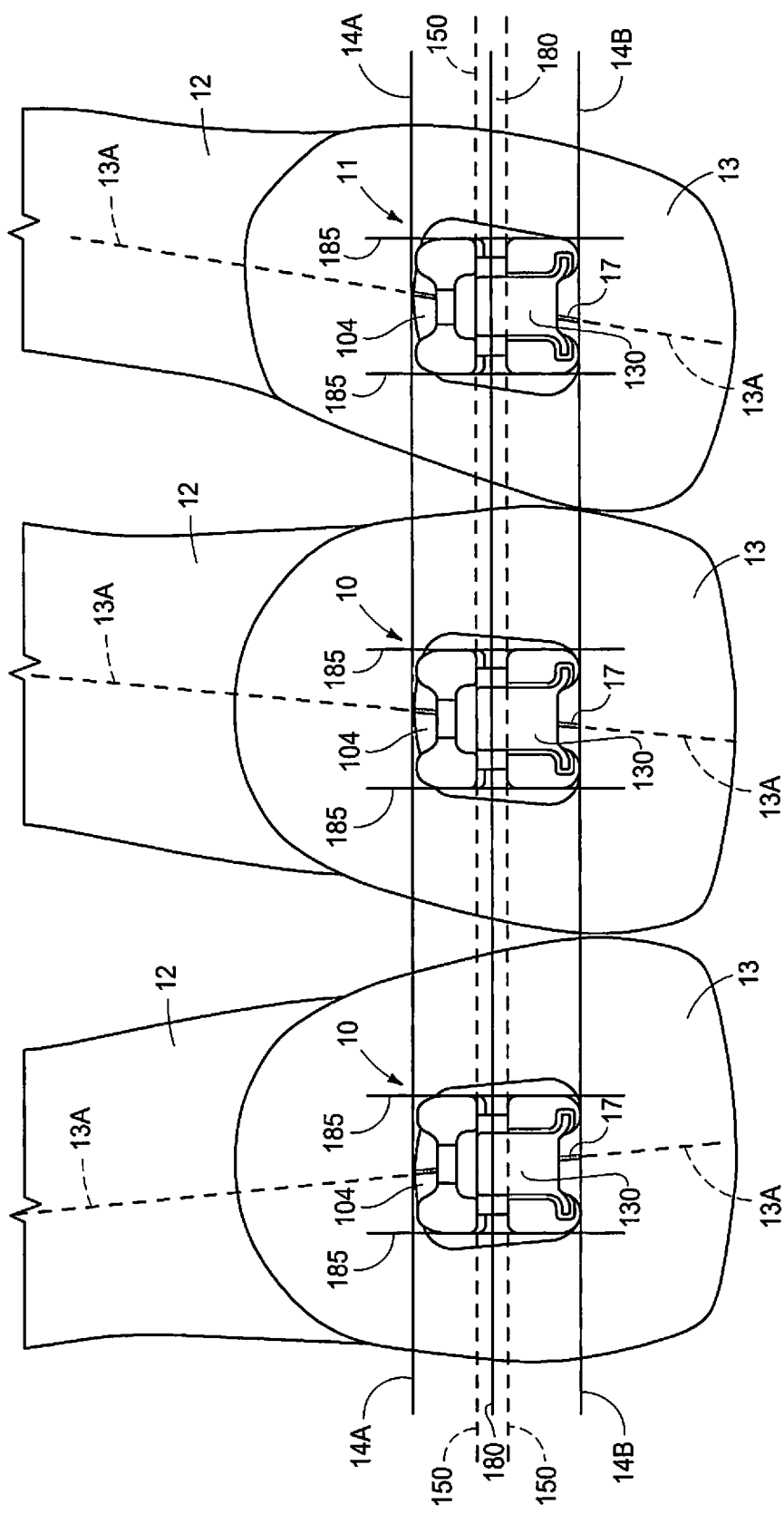

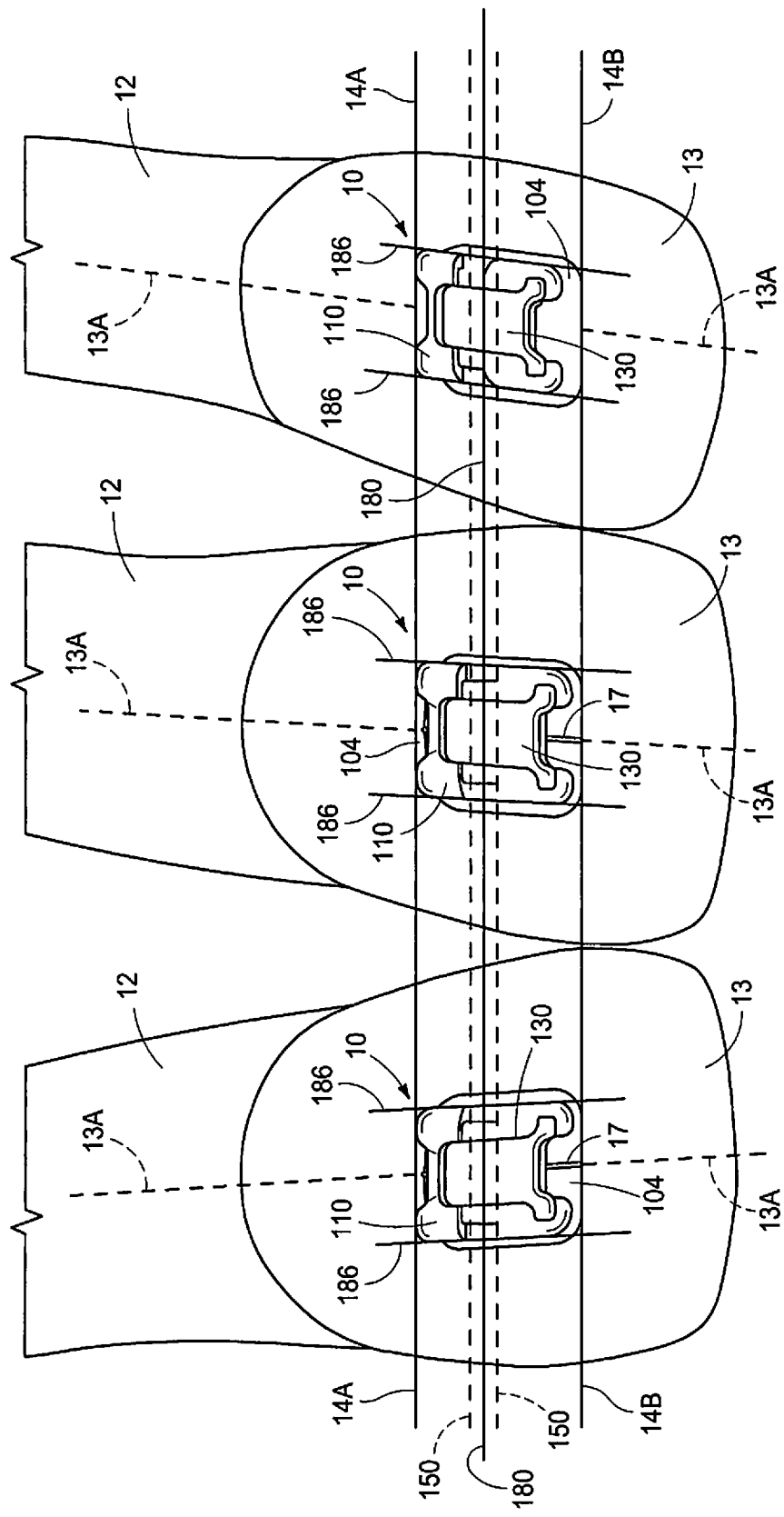

ORTHODONTIC BRACKET

TECHNICAL FIELD

The present invention relates to an orthodontic bracket, and more specifically to an orthodontic bracket which can be rendered operable, in various forms, to provide a multiplicity of torque expressions, and which individually, and forcibly act upon a patient's tooth while simultaneously remaining substantially in the same relative orientation on the anterior facing surface of a patient's tooth. Further, the new orthodontic bracket eliminates the prior art practice of bending an associated archwire so as to achieve a given torque expression, and which imparts a predetermined clinically significant movement to the patient's tooth.

BACKGROUND OF THE INVENTION

In our earlier U.S. Pat. No. 9,198,740, the teachings of which are incorporated by reference herein, we disclosed a novel orthodontic bracket which was readily, and easily utilized by a clinician, in a treatment setting, and which further provided a convenient means for movably adjusting the new orthodontic bracket in order to achieve a clinician selected first, second and/or third order movement of a patient's tooth in a manner not possible heretofore. In particular the aforementioned new and novel orthodontic bracket included a bracket base which was affixed to the anterior facing surface of a patient's tooth, and which further had a bracket body which was partially, rotatably moveable relative to the bracket base, and in a fixed axis of movement, when the bracket base was suitably affixed to the tooth. The teachings of this patent disclose a bracket body which can be releasably detached from the bracket base, and an alternative bracket body releasably attached to the bracket base during a given orthodontic treatment plan or period in order to provide a clinician a wide range of treatment options in advancing an orthodontic treatment regimen, and achieving desired first, second and third order movement of a patient's tooth in a manner not possible with prior art appliances which have been employed in the past.

In our recent U.S. patent application Ser. No. 14/976,074, and which was filed on Dec. 21, 2015, we disclosed an archwire for use with a passive self-ligation orthodontic bracket having an archwire slot, and wherein the archwire further includes an elongated, and resilient main body which is dimensioned to be received within the archwire slot of the passive self-ligation bracket. The resilient main body of the archwire has a circular-square or circular-rectangular cross-sectional shape having a predetermined circumferential width dimension, and a variable thickness dimension. The circumferential width dimension of the resilient main body of the new archwire maintains, at least in part, a consistent first order movement of a tooth of a patient when the resilient main body of the archwire is received in the archwire slot, and is cooperating with the passive self-ligation bracket body. The variable thickness dimension of the new archwire facilitates an adjustable application of a force to the passive self-ligation orthodontic bracket so as to achieve a clinician selectable, and controllable, second and third order of movement of the tooth of a patient. The archwire as described in this pending U.S. patent application has found particular usefulness when used with the orthodontic bracket design as taught in U.S. Pat. No. 9,198,740. Prior to the introduction of the orthodontic bracket as described in U.S. Pat. No. 9,198,740, fixed, passive self-ligation orthodontic brackets were commercially available, and which provided first, second or third order control over a patient's tooth. Several forms of these prior art self-ligating orthodontic brackets are seen in the drawings (FIGS. 1-3). These prior art passive self-ligation orthodontic brackets (FIGS. 1-3), have sometimes displayed shortcomings while being employed in some clinical settings which include, among others, providing an anterior facing surface which has a variable angular orientation based upon the type of torque control which was desired and being expressed. For example, the prior art includes orthodontic brackets which can express high or low torque couples (FIGS. 1 and 3 respectively). These particular orthodontic brackets have anterior facing surfaces which are oriented along different anterior-facing planes. Of course, these anterior facing surfaces come into contact with the inside of the lip of the patient wearing same, and sometimes create a different physical sensation for the patient wearing these orthodontic brackets (so called "mouth feel"). Still further, the orientation of the bracket body on the pad of these prior art orthodontic brackets (FIGS. 1 and 3) were such that the tie wing spacing, that is, the space between the tie wing of the bracket body, and the adjacent pad which was affixed to the anterior facing surface of the patient's tooth, varied when measured between the superior and inferior facing surfaces of the bracket body. Consequently, some clinicians often found it difficult to adequately place and secure individual archwires within the archwire slot, and further, it was oftentimes difficult for patients to maintain the cleanliness of their teeth because of the close spacial tolerances of the bracket bodies relative to the adjacent pad, and which supports the bracket body on the patient's tooth. This was especially true for orthodontic brackets which expressed high and low couples (FIGS. 1 and 3). Still further, achieving a clinically desirable deployment, placement or installation of these orthodontic brackets, especially on the upper and lower cuspids of a patient, often proved problematic. As can be imagined by studying FIGS. 1-3, the visual alignment of these prior art orthodontic brackets by a clinician on adjacent teeth of a patient, and in the same horizontal plane, by the alignment of the respective pads was virtually impossible to achieve because of the different angular orientations of each bracket body. Additionally, the use of these prior art passive self-ligation orthodontic brackets often created other perceived difficulties for many clinicians inasmuch as the physical orientation of the bracket body often prevented or made it problematic for the clinician to appropriately orient the respective orthodontic brackets on adjacent teeth in order to achieve an ideal archwire slot lineup which would facilitate the proper amount of torque being applied to the individual teeth undergoing correction.

Notwithstanding the difficulties, noted above, these prior art, passive self-ligating orthodontic brackets, when used with a conventional archwire, effected patient tooth movement by the transmission of torque to the adjacent tooth through the base or pad of the orthodontic bracket (this is often referred to as a "torque-in-base bracket). These prior art orthodontic brackets provided a huge advancement in the quality of orthodontic treatment, and have been utilized by many clinicians. However, because of the problems associated with the tie wing spacing, and which has often restricted the placement of C-chains, and elastics, on these appliances, and the problems associated with aligning the orthodontic bracket with adjoining orthodontic brackets to try and achieve level archwire slot line-up, these orthodontic brackets have not been as widely embraced by clinicians as might have been expected. In fact, the aforementioned shortcomings has been one of the major objections of many clinicians to utilizing passive self-ligation orthodontic brackets to achieve the kind of orthodontic treatment which is desired. In view of the aforementioned perceived shortcomings, many clinicians have failed to adopt this type or style of orthodontic bracket in their clinical practice. Consequently, the treatment times for many patients is often unduly long, and on many occasions, clinicians are not able to achieve the proper final tooth orientation which is desired for their patients.

While the aforementioned new orthodontic bracket as seen in U.S. Pat. No. 9,198,740, and the new archwire as described in U.S. patent application Ser. No. 14/976,074 have operated with a great deal of success, some difficulties still remain for clinicians in establishing the proper orientation or placement of an orthodontic bracket on a patient's teeth, such as on the upper and lower cuspids. These, and other perceived problems have caused each of the inventors to reflect, at great length, concerning a possible solution to the various clinician perceived problems, and other shortcomings, which are associated with the placement of orthodontics brackets in a proper orientation relative to each other, and on other somewhat problematic teeth. This study, and later investigation, led to the reevaluation of both the perceived shortcomings of the prior art (FIGS. 1-3), as well as the many advantages provided by the use of the orthodontic bracket as seen in the earlier U.S. patent, which is noted, above; and the new archwire which has enhanced the use and operation of this same orthodontic bracket. This investigation has resulted in the creation of a new orthodontic bracket, having several different forms, and which is the subject matter of the present application.

The orthodontic bracket of the present invention avoids the detriments and shortcomings associated with the prior art passive self-ligation orthodontic brackets (FIGS. 1-3) discussed above, and further allows clinicians an additional clinical option in providing first, second or third order control for problematic maloccluded teeth, such as the upper and lower cuspids, which have often been difficult for a clinician to correct. A new orthodontic bracket having several forms, and which achieves these and other objectives is the subject matter of the present patent application.

SUMMARY OF THE INVENTION

A first aspect of the present invention relates to an orthodontic bracket which includes a bracket body which is releasably affixed to an anterior facing surface of a patient's tooth, and which further has an anterior, outwardly facing surface, and wherein the bracket body further defines an archwire slot which is oriented in a predetermined angular orientation relative to the bracket body, and which further receives, and cooperates with an archwire having a predetermined cross-sectional shape, and wherein the archwire, when received in the bracket body, expresses a predetermined amount of torque to the anterior facing surface of the bracket body to effect a first, second or third order of movement of the patient's tooth, and wherein the orthodontic bracket when used with other orthodontic brackets of similar design, and which are positioned on adjacent teeth of the patient, produce a center level archwire slot line-up, and wherein the archwire is received within the center level archwire slot line-up of the respective orthodontic brackets with no substantial bending notwithstanding that the adjacent orthodontic brackets effect different first, second or third order movements to the adjacent teeth.

Another aspect of the present invention relates to an orthodontic bracket which includes a bracket body which is releasably affixed to an anterior facing surface of a patient's tooth, and which is immovable relative thereto, and wherein the bracket body defines an archwire slot for receiving and cooperating with an archwire having a given shape, and wherein the bracket body further has an anterior facing surface which is oriented along a given plane, and wherein a tie wing space or gap is defined between bracket body, and the patient's tooth, and further has a given, constant dimension, and wherein the anterior facing surface of the bracket body remains oriented in the same plane, and the tie wing spacing dimension remains the same notwithstanding that the bracket body is rendered operable, in various forms, to impart first, second or third order movement to the patient's tooth.

Still another aspect of the present invention relates to an orthodontic bracket which includes a pad which is releasably affixed to an anterior facing surface of a patient's tooth, and which is further undergoing an orthodontic treatment regimen; and a bracket body is made integral with the pad, and which extends anteriorly outwardly relative to the pad, and wherein the bracket body further defines an archwire slot for receiving and cooperating with an archwire having a given shape, and wherein the archwire, when cooperating with the bracket body transmits torque to the bracket body so as to cause a clinician selected first, second or third order movement of the patient's tooth, and wherein the archwire slot has a cross-sectional, quadrilateral shape which is defined, in part, by 4 angles which are not right angles.

These and other aspects of the present invention will be discussed in greater detail in the application which follows.

BRIEF DESCRIPTION OF THE DRAWINGS

Preferred embodiments of the invention are described, below, with reference to the following accompanying drawings.

FIG. 7 is a greatly enlarged, partial, side elevation view of one form of the orthodontic bracket of the present invention, and which illustrates the structure of the archwire slot associated with same, and which is operable to express a high torque couple.

FIG. 8 is a greatly enlarged, partial, side elevation view of a prior art self-ligating orthodontic bracket, and which illustrates the structure of an archwire slot as employed with this orthodontic bracket, and which exerts a standard, neutral or no torque couple.

FIG. 9 is a greatly enlarged, partial, side elevation view of still another form of the orthodontic bracket of the present invention, and which illustrates the structure of an archwire slot which is operable to express a low torque couple.

FIG. 10 is a greatly enlarged, side elevation view of one form of the present invention, and which is operable to exert a high torque couple on a new archwire which is utilized with same.

FIG. 11 is a greatly enlarged, side elevation view of a prior art self-ligating orthodontic bracket, and which is operable to express a standard, neutral or no torque couple on a new archwire which is utilized with same.

FIG. 12 is a greatly enlarged, side elevation view of yet another form of the orthodontic bracket of the present invention, and which is operable to exert a low torque couple on a new archwire as described in the present application.

FIG. 13 is a greatly enlarged, simplified, side elevation view of one form of the present invention, and which illustrates the cooperation of an archwire of the present invention in combination with an archwire slot having the quadrilateral shape as shown.

FIG. 14 is a greatly enlarged, simplified, side elevation view of a prior art orthodontic bracket, and which illustrates the cooperation of the new archwire as illustrated, with an archwire slot having the rectangular shape as illustrated.

FIG. 15 is a greatly enlarged, simplified, side elevation view of an archwire of the present invention cooperating with an archwire slot having the quadrilateral shape as shown in that drawing.

FIG. 23A is a greatly enlarged, partial, environmental, anterior facing view of one form of the present invention as placed on one of several of a patient's teeth, and wherein the orthodontic bracket is operable to express a low torque couple on an enclosed archwire which is shown in phantom lines.

FIG. 23B is a greatly enlarged, partial, environmental, anterior facing view of the present invention as placed on one of several of a patient's teeth, and wherein the orthodontic bracket is operable to express a high torque couple on an enclosed archwire which is shown in phantom lines.

FIG. 23C is a greatly enlarged, partial, environmental, anterior facing view of a prior art orthodontic bracket as placed on one of several of a patient's teeth, and wherein the orthodontic bracket is operable to express a neutral or no torque couple on an enclosed archwire which is shown in phantom lines.

FIG. 24A is a greatly enlarged, partial, environmental, anterior facing view of another form of the present orthodontic bracket as placed on one of several of a patient's teeth, and wherein the new orthodontic bracket is operable to express a low torque couple on an enclosed archwire, and wherein the bracket body, and the pad of the orthodontic bracket are aligned with the longitudinal axis of a patient's tooth while simultaneously maintaining a level archwire slot line-up with adjacent orthodontic brackets.

FIG. 24B is a greatly enlarged, partial, environmental, anterior facing view of another form of the present orthodontic bracket as placed on one of several of a patient's teeth, and wherein the new orthodontic bracket is operable to express a low torque couple on an enclosed archwire, and wherein the bracket body, and the pad of the orthodontic bracket are aligned with the longitudinal axis of a patient's tooth while simultaneously maintaining a level archwire slot line-up with adjacent orthodontic brackets.

FIG. 24C is a greatly enlarged, partial, environmental, anterior facing view of another form of the present orthodontic bracket as placed on one of several of a patient's teeth, and wherein the new orthodontic bracket is operable to express a low torque couple on an enclosed archwire, and wherein the bracket body, and the pad of the orthodontic bracket are aligned with the longitudinal axis of a patient's tooth while simultaneously maintaining a level archwire slot line-up with adjacent orthodontic brackets.

DETAILED DESCRIPTION OF THE PREFERRED EMBODIMENTS

This disclosure of the invention is submitted in furtherance of the constitutional purposes of the U.S. Patent Laws "to promote the progress of science and the useful arts" (Article 1, Section 8).

Figures 1, 2, 3:
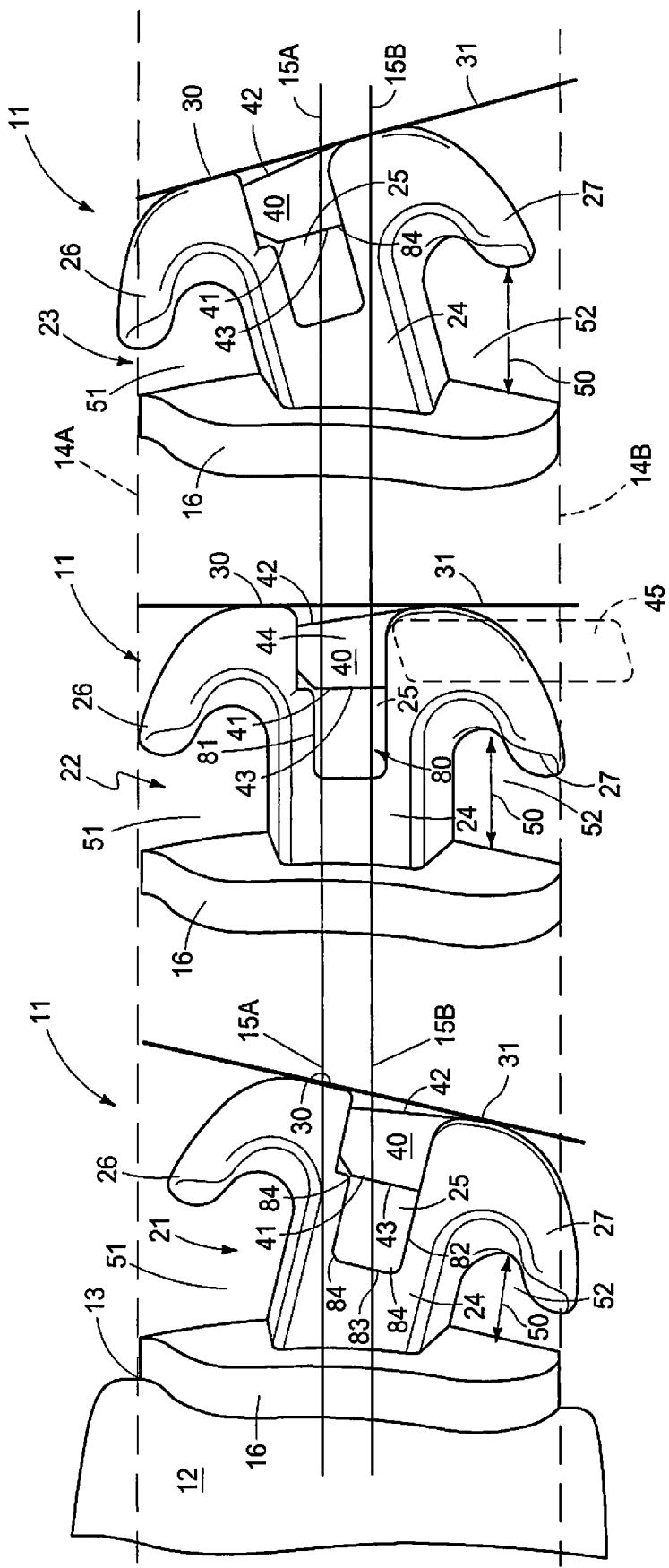
FIG. 1 is a side elevation view of a prior art passive, self-ligating orthodontic bracket which is operable to express a high torque couple.
FIG. 2 is a prior art passive, self-ligating orthodontic bracket which is operable to express a standard or neutral, or no torque couple.
FIG. 3 is a prior art, passive self-ligating orthodontic bracket which is operable to express a low torque couple.
Figures 4, 5, 6:
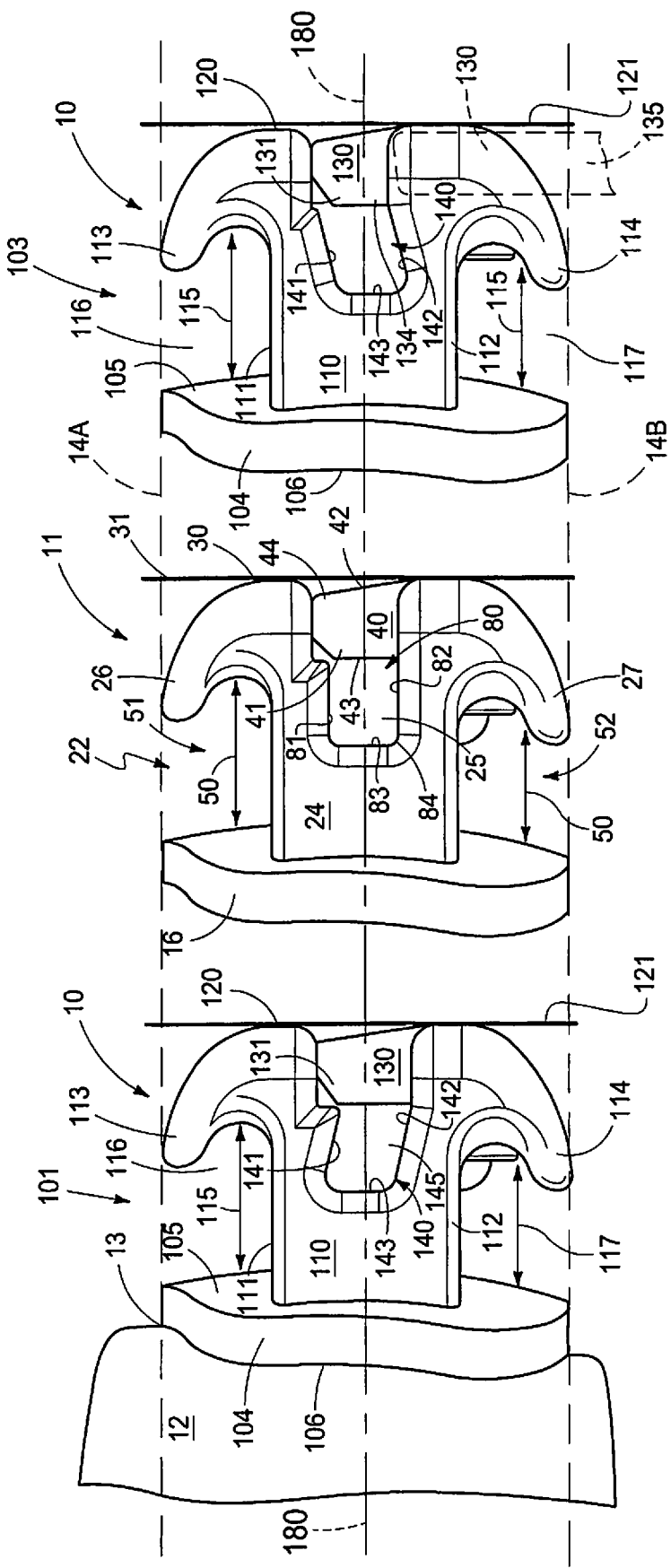
FIG. 4 is a perspective, side elevation view of one form of the orthodontic bracket of the present invention, and which is operable to express a high torque couple.
FIG. 5 is a perspective, side elevation view of a prior art self-ligating orthodontic bracket, and which is operable to express a neutral, standard or no torque couple.
FIG. 6 is a perspective, side elevation view of another form of the new orthodontic bracket of the present invention, and which is operable to express a low torque couple.
Figure 16:
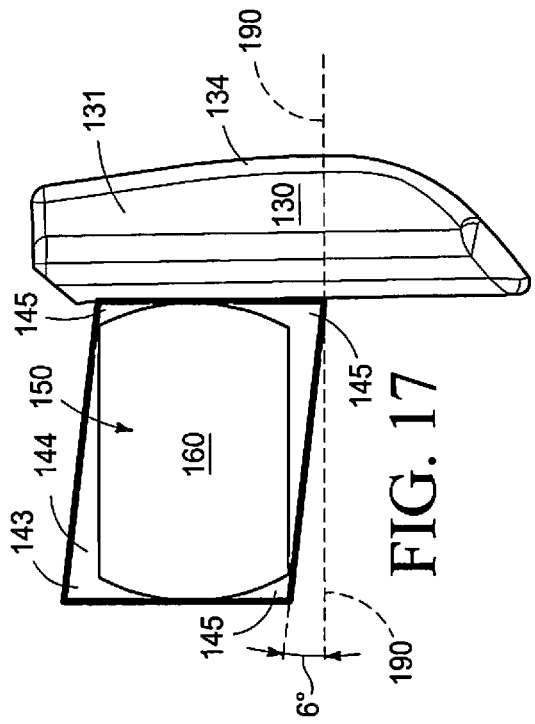
FIG. 16 shows one form of an archwire slot shape which expresses a high torque couple when used with an enclosed archwire, and wherein the angular orientation of the archwire slot is located approximately 3 degrees above a horizontal plane.
Figure 17:
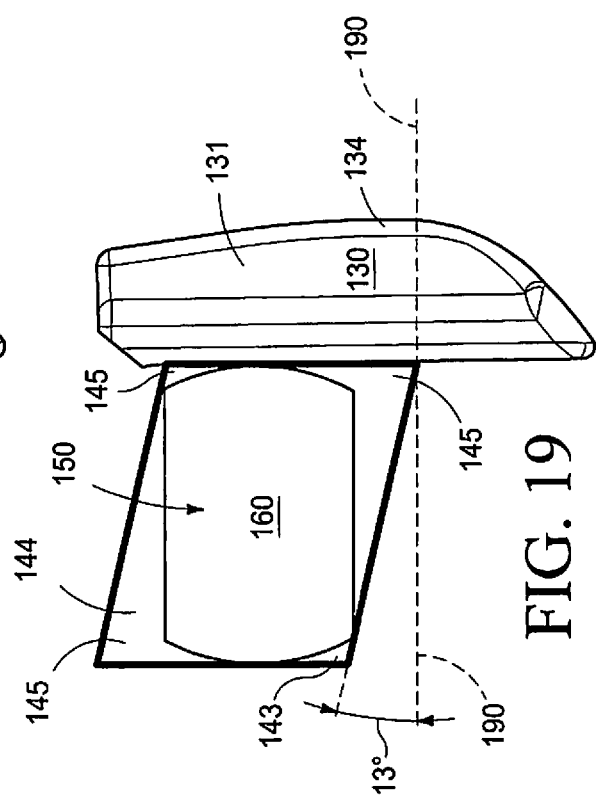
FIG. 17 is a second form of an archwire slot shape which expresses a high torque couple when used with an enclosed archwire, and wherein the angular orientation of archwire slot is about 6 degrees above a horizontal plane.
Figure 18:
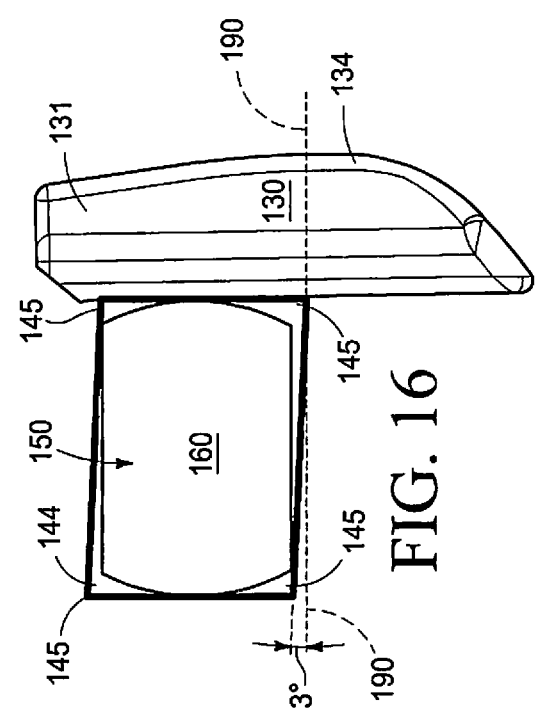
FIG. 18 is yet another form of an archwire slot shape which expresses a high torque couple when used with an enclosed archwire, and wherein the archwire slot is oriented approximately 9 degrees above a horizontal plane.
Figure 19:
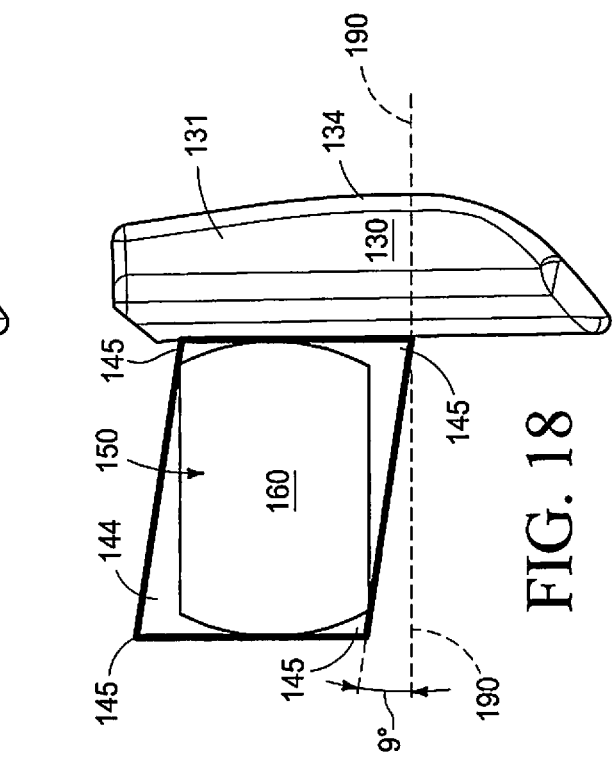
FIG. 19 is still another form of an archwire slot shape which expresses a high torque couple when used with an enclosed archwire, and wherein the archwire slot is oriented at about 13 degrees above a horizontal plane.

Referring now to the drawings the present invention, in its various forms, is generally indicated by the numeral 10 in FIG. 4, and following. As earlier discussed in this application, prior art self-ligating brackets which may be utilized to express high, neutral, or low torque couples on an archwire which is enclosed, and cooperating with same, are generally indicated by the numeral 11, and are seen in FIGS. 1, 2 and 3 respectively. It should be understood that the orthodontic brackets 10, as described herein, all are utilized to adjust or correct the malocclusion of various teeth in a patient's mouth, not shown, so as to provide a more appealing personal appearance, as well as to correct biting deficiencies due to the orientation of various teeth in the dental arches of the patient. A tooth of a patient is only fragmentarily shown in FIGS. 1, 4, 23A, B, and C; and FIGS. 24A, B, and C, respectively. Each of the teeth of the patient undergoing treatment would releasably mount an orthodontic bracket 10, as will be described hereinafter (FIGS. 23A-C, and 24 A-C, respectively). Each tooth 12 has an anterior facing surface 13, and upon which the orthodontic bracket 10 is releasably affixed by a suitable adhesive or some other mechanical means. The present invention relates to an orthodontic bracket 10 and wherein the invention, in its various forms, and in combination with an archwire, displays a multiplicity of torque expressions which individually, and forcibly act upon a patient's tooth 12. These torque expressions are generated or created by an un-bent archwire (as will be disclosed) so as to provide, or generate gentle, biologically appropriate forces which achieve effective tooth movement with minimal clinical treatment times. For purposes of this application "torque expression" as used, hereinafter, is defined as the force which provides rotation of a patient's tooth, that is, tip of the crown or root either labially, lingually, or buccally around an axis, that is, in the mesial or distal direction. First order movements are commonly thought of as rotation and/or in-and-out movements. This refers to movements that can be viewed from the occlusal perspective. On the other hand, second order movements are often referred to as tipping, and can be viewed from a buccolingual or labiolingual perspective. These second order movements are used for paralleling of the roots of the patient's teeth, as well as elevating or depressing a given tooth. Finally, third order movements, and which is commonly referred to as "torque", can be viewed from a mesial-distal perspective or a buccolingual cross-section. These movements are typically about the mesial-distal axis. This movement is important in attempting to achieve proper incisor or labiolingual or buccolingual inclination, or tip of the crown. Referring now to FIGS. 1, 2 and 3, it should be understood that the lines labeled 14A and B, and which further extend across FIGS. 1-3, represents imaginary orientation lines which might be utilized by a clinician so that the prior art orthodontic brackets 11 could be aligned, and approximately placed in the same horizontal plane along the teeth 12, of the patient undergoing treatment. Because of the small size of the prior art orthodontic brackets being employed, heretofore, (FIGS. 1-3) clinicians have often horizontally aligned, to the degree possible, the pads 16, and which are then adhesively affixed to the anterior facing surface of the tooth 13, in the same horizontal plane, or along, and between, the same lines 14A or 14B, so as to facilitate, to the degree possible, the insertion of an archwire as will be described, below, within the archwire slot, and which is defined by or formed in the orthodontic bracket 11. Lines 15A and 15B are provided in FIGS. 1, 2 and 3. Line 15A passes through the center of the archwire slot of the orthodontic bracket as seen in FIG. 3, and which is operable to express a low torque couple to an archwire which would be received in same. On the other hand, Line 15B extends through the center of the archwire slot of the orthodontic bracket 11 as seen in FIG. 1, and which is operable to express a high torque couple with an archwire which would be received in same. These lines (15A and 15B) are provided in these views to demonstrate that a level archwire slot line-up is nearly impossible to achieve by using the prior art appliances. In view of these shortcomings clinicians have routinely bent or physically manipulated an archwire so as to allow it to be received with the accompanying archwire slot. This bending of the archwire has led to problems associated with imparting biologically inappropriate amounts of force to the underlying tooth 12, and the supporting tissue of the same tooth. A further comprehensive discussion regarding the perceived shortcomings of these prior art orthodontic brackets 11 to consistently achieve a level, archwire slot lineup will be discussed in the paragraphs which follow.

Figure 20A:
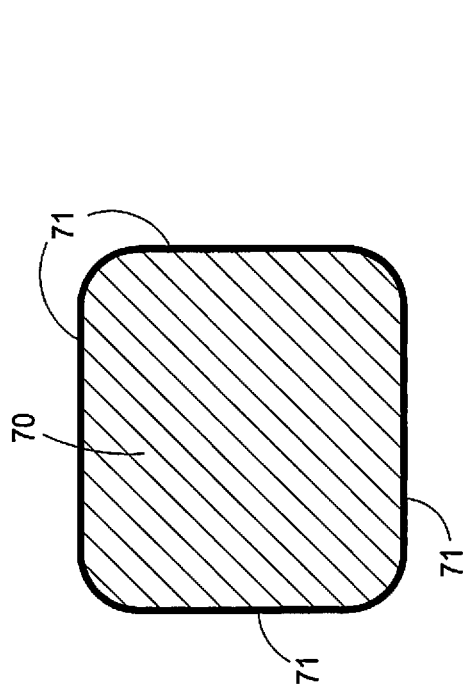
FIG. 20A is a greatly enlarged, transverse, vertical sectional view of a prior art standard, square or rectangular finishing archwire, and which has been utilized by clinicians for many years.
Figure 20B:
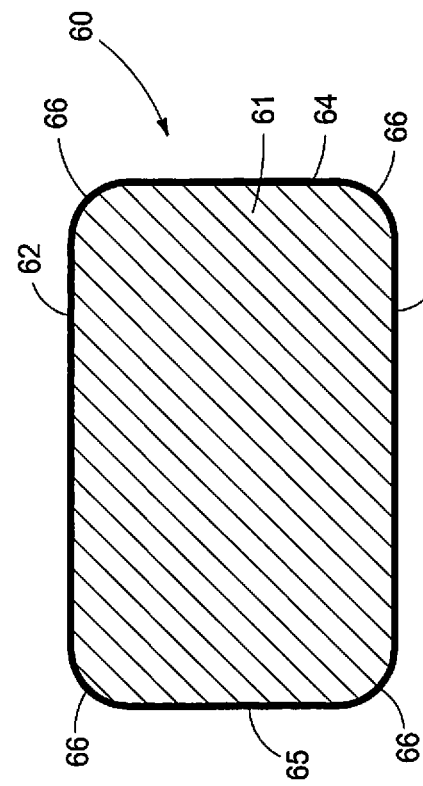
FIG. 20B is a greatly enlarged, transverse, vertical section view of a prior art rectangular archwire, and which has been utilized by clinicians for many years.

Referring again to FIGS. 1, 2 and 3 the prior art self-ligating orthodontic brackets 11, as illustrated, show an earlier attempt to produce orthodontic brackets which can, in several different forms, express first, second and third order movement to a patient's tooth 12. In this regard FIG. 1 illustrates a first form 21 of a prior art orthodontic bracket 11, and which expresses a high torque couple when an archwire of suitable design is received within the bracket body as will be described. FIG. 2 illustrates a second form 22 of a prior art self-ligating orthodontic bracket 11, and which expresses a neutral or standard (no) torque couple; and FIG. 3 illustrates a third form 23 of a prior art self-ligating orthodontic bracket, and which is fabricated such that it may express a low torque couple to an archwire which is received in, and cooperates with the orthodontic bracket 23. It is important to understand that in the first or third form of the prior art orthodontic brackets 21, and 23, respectively, the torque is expressed or transmitted through the base or pad 16 by way of the given angular orientation of the bracket body as it is affixed or made integral with the pad 16. The first, second and third forms 21, 22 and 23 of the prior art self-ligating orthodontic brackets have common features. As a first matter, each has a pad 16 which has a posterior facing surface which is typically adhesively affixed to the anterior facing surface 13 of a patient's tooth 12, and which is undergoing orthodontic treatment. As seen in FIGS. 23A-23C, and FIGS. 24A-C, each tooth 12 has a longitudinal axis which is indicated by the line labeled 13A. Still further each of the forms of the prior art self-ligating orthodontic bracket 11 (FIGS. 1-3) has a bracket body 24 which extends anteriorly outwardly relative to the pad 16. The bracket body of each of the forms of the prior art orthodontic bracket 11 defines a similarly dimensioned, rectangular shaped archwire slot 25 which is sized so as to cooperate with a square or rectangular shaped archwire of traditional design (FIGS. 20A and 20B). These prior art archwires are shown in these greatly enlarged cross sectional views. The archwire slot 25 is oriented substantially coaxially relative to the bracket body 24. This orientation contributes, at least in part, to the transmission of the generated torque to the pad 16, as earlier discussed. The bracket body 24 of each of the prior art orthodontic brackets 11 defines, in part, a superior tie wing 26, and an opposite, inferior tie wing 27.

The first, second and third forms 21, 22 and 23 of the prior art passive, self-ligation orthodontic brackets as seen in FIGS. 1, 2 and 3, respectively, each has an anterior facing surface 30 which is defined by each bracket body 24. The anterior facing surface 30 further defines a given anterior facing plane which is identified by the line labeled 31. A close study of FIGS. 1, 2 and 3 will illustrate that the various forms of the prior art orthodontic brackets 11, when expressing high; standard; or low torque couples (FIGS. 1, 2, and 3 respectively) each has an anterior facing surface 30 which forms different angulated anterior facing planes 31. This widely variable angulation of these respective planes 31 presents a different type of overall surface texture which may be felt by the inner lip of a patient undergoing orthodontic treatment. Moreover, the anterior facing appearance of the each of the prior art orthodontic brackets is quite different. This different appearance, often inhibited, at least in part, a clinician in properly, visually orienting, each of the pads 16 in a level, and aligned orientation along the patients teeth 12 so as to achieve a remotely close, and level, archwire slot 25 line-up. Further, these variable anterior facing planes 31, of course, create a different sense of comfort (mouth-feel) for the patient depending upon the forms of the prior art orthodontic bracket being employed to correct the malocclusion of the underlying teeth 12. Still referring to FIGS. 1, 2 and 3 it will be noted that the bracket body 24 mounts a moveable gate 40 of traditional design. The moveable gate 40 has a main body 41 which has an anterior facing surface 42, and which lies somewhat approximately, and generally along, or parallel to, the plane 31 of each form of the orthodontic bracket 11. The moveable gate 40 further has an opposite, posterior facing surface 43 which defines, at least in part, a portion of the archwire slot 25, as will be discussed in greater detail, below. The moveable gate 40 is operable to slideably move along or cooperate with the anterior facing surface 30. The moveable gate 40 travels from a first occluding position 44, which retains an archwire in an operable orientation within the rectangular shaped archwire slot 25, and a second, non-occluding position 45 (phantom lines, FIG. 2), and which allows the archwire to be removed from, or placed within, the archwire slot 25. In addition to the foregoing, it will be noted from studying FIGS. 1, 2 and 3 that a tie wing gap, or spacing 50, is defined between the bracket body 24 and in particular the superior and inferior tie wings 26 and 27 thereof, and the adjacent pad 16. From a close study of FIG. 1, and where the first form 21 of the prior art bracket body 24 expresses a high torque couple; and FIG. 3 which shows a third form 23, and which further expresses a low torque couple, it will be understood that the respective dimensions of the superior and inferior tie wing gaps, or spaces 51 and 52 change, rather significantly. As will be seen in FIG. 1, the dimensions of the superior tie wing gap or spacing 51 is greater than the dimension of the inferior tie wing gap or spacing 52. The opposite is true for that form of the prior art orthodontic bracket 23 as seen in FIG. 3. As noted earlier in this application, this small or quite variable dimensioned tie wing gap or spacing 50 has discouraged some clinicians from utilizing passive, self-ligation orthodontic brackets because it is often difficult to place C-chains, elastics, and the like in the tie wing gap which is provided. Still further, the smaller dimensioned tie wing gap or spaces 50 often provide a location where food debris, and other undesirable substances may become lodged, thereby making a patient's subsequent dental hygiene somewhat more difficult.

As further seen in FIGS. 1, 2 and 3, lines 14A and 14B are provided and which represent imaginary lines which an orthodontist might use in order to assist in the proper placement of the prior art orthodontic brackets 11, on adjacent teeth 12, of a patient undergoing treatment. As can be seen, lines 14A and 14B are located a given distance apart, and ideally, a clinician placing the individual orthodontic brackets 11 on a patient's teeth 12 would align the pads 16 between these imaginary lines in order to closely orient or align the respective archwire slots 25 so as to provide, to the degree feasible, a substantially level archwire slot 25 lineup. This level archwire slot 25 lineup would assist a clinician in inserting an archwire 60, of traditional design (FIGS. 20A and 20B), within the archwire slot 25. One prior art archwire 60 is shown in FIG. 20B. However, as will be seen by studying FIGS. 1, 2 and 3, and referring specifically to the lines labeled 15A and 15B, it will be easily recognized that it was typically, nearly impossible, to achieve a level archwire slot 25 lineup when a high torque couple, and low torque couple orthodontic brackets 21 and 23, that is, those orthodontic brackets seen in FIGS. 1 and 3, were utilized in combination with a standard or no torque bracket (FIG. 2) because the center of the archwire slot 25 as seen in FIG. 1 (Line 15B), as further compared to the center of the archwire slot 25 as seen in FIG. 3 (Line 15A) were both significantly vertically separated from each other, and from the center of the archwire slot 25 as seen in FIG. 2. As seen in FIGS. 1 and 3, the archwire slot 25 of these prior art orthodontic brackets 11 move vertically to express the different desired torques which is then transmitted through the pad 16 to the underlying tooth 12. Because of this vertical movement a level archwire slot 25 line-up with adjacent orthodontic brackets 11 was impossible to achieve. Consequently, to achieve an insertion or placement of the archwire 60 within the archwire slot 25, the clinician resorted to a bending, and/or other physical manipulation of the archwire 60. This bending and other distortion of a standard archwire has created numerous problems, and increases the difficulty for a clinician in achieving proper first, second and third order control of a patient's tooth 12. Moreover, this bending, and other manipulation of the archwire often resulted in a biologically inappropriate amount of force to be exerted on the patient's teeth and the supporting tissue for the same teeth. When this problem is associated with the earlier mentioned difficulties of placing C-chains, and elastics, in the reduced dimensioned tie wing gaps or spaces 50, many clinicians elected to not use these prior art self-ligating orthodontic brackets 11 (notwithstanding their many clinical advantages) and have, instead utilized other prior art orthodontic brackets or appliances. This clinical decision has often unduly prolonged the treatment time, and decreased the comfort of their patients. Furthermore, the traditional archwire 60, and which is substantially rectangular, or square in shape, could often frictionally bind within the archwire slot 25, or otherwise impede the movement of the moveable gate 40 depending upon the type of torque couple being expressed by the prior art orthodontic brackets 11.

As explained more fully in U.S. patent application Ser. No. 14/976,074, the teachings of which are incorporated by reference herein, the use of a rectangular shaped archwire 61 (FIG. 20B) of the prior art has presented many difficulties in utilizing the prior art self-ligating orthodontic brackets 11, as illustrated in FIGS. 1, 2 and 3, respectively. Chief among these problems is the propensity for these prior art archwires to bind within, or otherwise frictionally engage the moveable gate 40 in such a manner so as to impede, or substantially prevent a clinician from closing or moving the moveable gate 40 into the first occluding position 44, and which retains the archwire 60 within, and in an operable orientation relative to, the archwire slot 25. To address this problem, orthodontists have used various smaller sized rectangular and/or square shaped archwires 70 (FIG. 20A) in order to create sufficient spacing for the archwire to be placed within the archwire slot 25, and then close the accompanying, and moveable gate 40. Further, the orthodontic bracket 11, and the moveable gate 40 were fabricated so as to allow some small amount of in-and-out movement or "play" in the gate 40 such that an orthodontist could effect a closure of the gate 40. Still further the selection of a smaller sized archwire 70 creates other problems inasmuch as reducing the size, of the archwire in order to allow closure of the moveable gate 40 often resulted in prolonged treatment times for a patient undergoing a given orthodontic treatment regimen because a smaller dimensioned archwire creates less torque and rotation control of the tooth 12. Again, the inability to provide a wide range of torque couples reduces the ability of the clinician to achieve the type of tooth control they might otherwise wish to have, but which cannot be achieved with the prior art self-ligating orthodontic brackets as seen in FIGS. 1, 2 and 3, respectively. As will be seen in FIG. 20B, a rectangular shaped archwire 61 is shown in a greatly enlarged cross-sectional view, and has opposite, superior and inferior facing surfaces 62 and 63, respectively, and opposite, anterior and posterior facing surfaces 64 and 65, respectively. The rectangular shaped archwire 61 has four edges 66, all of which can frictionally and forcibly engage either the inwardly oriented surfaces defining the archwire slot 25, and/or the posterior facing surface 43 of the moveable gate 40. As seen in FIG. 20A, a square or rectangular shaped finishing archwire 70, of traditional design, is illustrated, and which has been utilized to provide orthodontic treatments with outstanding first, second and third order control. Again, however, the square, or rectangular shaped archwire 70, as seen in FIG. 20A, includes multiple exterior facing surfaces 71, and corners, all of which can possibly frictionally engage the archwire slot 25, or the posterior facing surface 43 of the moveable gate 40, thereby impeding the clinician in closing the gate 40, and achieving the desired first, second and third order movement, and control, that is necessary to address a given tooth malocclusion.

Referring still to the prior art orthodontic brackets as seen in FIGS. 1, 2 and 3 it will be understood that the archwire slot 25 of these prior art orthodontic brackets 11 has a rectangular shape 80 which is defined, at least in part, by a superior, inwardly facing surface 81 of the bracket body 24. The superior inwardly facing surface 81 is spaced from an inferior inwardly oriented, and parallel surface 82. Still further, a posterior, inwardly facing surface 83 connects the superior and inferior surfaces 81 and 82 together to form a rectangle. The archwire slot shape 80 is further defined, at least in part, by the posterior facing surface 43 of the moveable gate 40. As will be recognized from studying FIGS. 1, 2 and 3, the archwire slot shape 80 is defined by four edges or corners 84 all of which are right angles. As can be seen in FIGS. 1-3, the archwire slot 25, as formed in each bracket body 24, is oriented generally symmetrically, centrally and coaxially relative to the bracket body 24, and further the rectangular shaped archwire slot 25 is generally perpendicularly oriented relative to the anterior facing plane 31, as defined by the anterior facing surface 30 of the bracket body 24. Because of this physical arrangement, the cooperation of the respective archwire 60, or 70 (FIGS. 20A and 20B) within the archwire slot 25, the bracket body 24, effects a torque expression which is chiefly transmitted through the pad 16 to the underlying tooth 12. This is very much in contrast to the present invention 10, as will be described, below.

Referring now to FIG. 4, and following, the new orthodontic bracket of the present invention, and which is generally indicated by the numeral 10, includes first and second forms, and which are generally indicated by the numerals 101, and 103, respectively. In this regard, and in the first form of the orthodontic bracket 101, as seen in FIG. 4, this form is operable to express a high torque couple when it is used in combination with an archwire which will be discussed in greater detail, hereinafter. Still further the orthodontic bracket 22, as seen in FIG. 5, expresses a neutral torque or no torque couple on the archwire as will be described, hereinafter. The orthodontic bracket 22 is prior art. Still further the second form of the new orthodontic bracket 103, (FIG. 6) is operable to impart a low torque couple to a suitable archwire when employed in the manner which is discussed, below. The new orthodontic bracket 10 is similar, in some respects, to that which was described earlier in this application relative to the prior art. One of the common features includes a pad 104 which is defined, at least in part, by an anterior facing surface 105, and an opposite posterior facing surface 106. The pad 104 is nearly identical in construction to the pad 16 as seen in FIGS. 1-3. The posterior facing surface 106 is affixed to the anterior facing surface 13 of a tooth 12 which is undergoing orthodontic treatment by a suitable adhesive. While the pad 104 is somewhat similar to the pad 16, the torque expressed by the present invention 10 is not typically transmitted through the pad 104, as was the case with the prior art orthodontic brackets 11 (FIGS. 1 and 3). Rather the torque of the present invention 10 is expressed in the anterior facing surface 120 of the bracket body 110 which will be discussed, below. The anterior facing surface of the pad 104 has formed therein an orientation line 17 (FIGS. 23A-C and FIGS. 24A-C, respectively), and which allows a clinician to orient the pad to substantially lay along or be placed in substantially parallel alignment with the longitudinal axis 13A, of the patient's tooth 12 which is receiving orthodontic treatment. This allows the bracket body 110 of one form of the orthodontic bracket 10 to be substantially vertically aligned, or oriented as indicated by the lines labeled 185 (FIGS. 23A-23C, respectively). In another form of the invention 10, as seen in FIGS. 24A-24C, each bracket body 110 of the invention 10 are manufactured or formed in a manner where the respective bracket bodies 110 are aligned relative to the longitudinal axis 13A of each of the patient's teeth 12 being treated. The individual alignment of each of the bracket bodies 110 is indicated by the lines labeled 186. Similar to what was described relative to the earlier prior art (FIGS. 1-3), the new orthodontic bracket of the present invention 10 includes a bracket body 110 which is made integral with the pad 104, and which further has a superior facing surface 111, and an opposite inferior facing surface 112. Still further the bracket body 110 defines a superior tie wing 113, and an opposite inferior tie wing 114. The superior and inferior tie wings 113 and 114 define a tie wing gap 115, when measured between the respective tie wings, and the anterior facing surface 105 of the pad 104, and which has given dimensions. As will be recognized from a study of FIGS. 4, 5 and 6 the dimension of the tie wing gap 115 is substantially constant for each orthodontic bracket 10. In particular, the tie wing gap 115, as measured on the superior surface 111, and inferior surface 112, remains somewhat closely similar and is generally the same regardless of the form of the orthodontic bracket (101, 22, or 103) which is being employed. This particular design feature avoids at least some of the problems associated with the prior art self-ligating orthodontic brackets (21, 22, 23) inasmuch as it removes the earlier perceived impediment which concerned the placement of C-chains, elastics, and the like, in the region of the tie wing gap 115. Therefore, this feature aides a clinician in the rapid, and easy installation, and use of the orthodontic bracket 10 after it is properly placed on a patient's tooth 12. As will be recognized, this uniform or constant dimensioned tie wing gap 115 also assists the patient in keeping the orthodontic bracket clean during the clinical treatment period.

Figure 22:
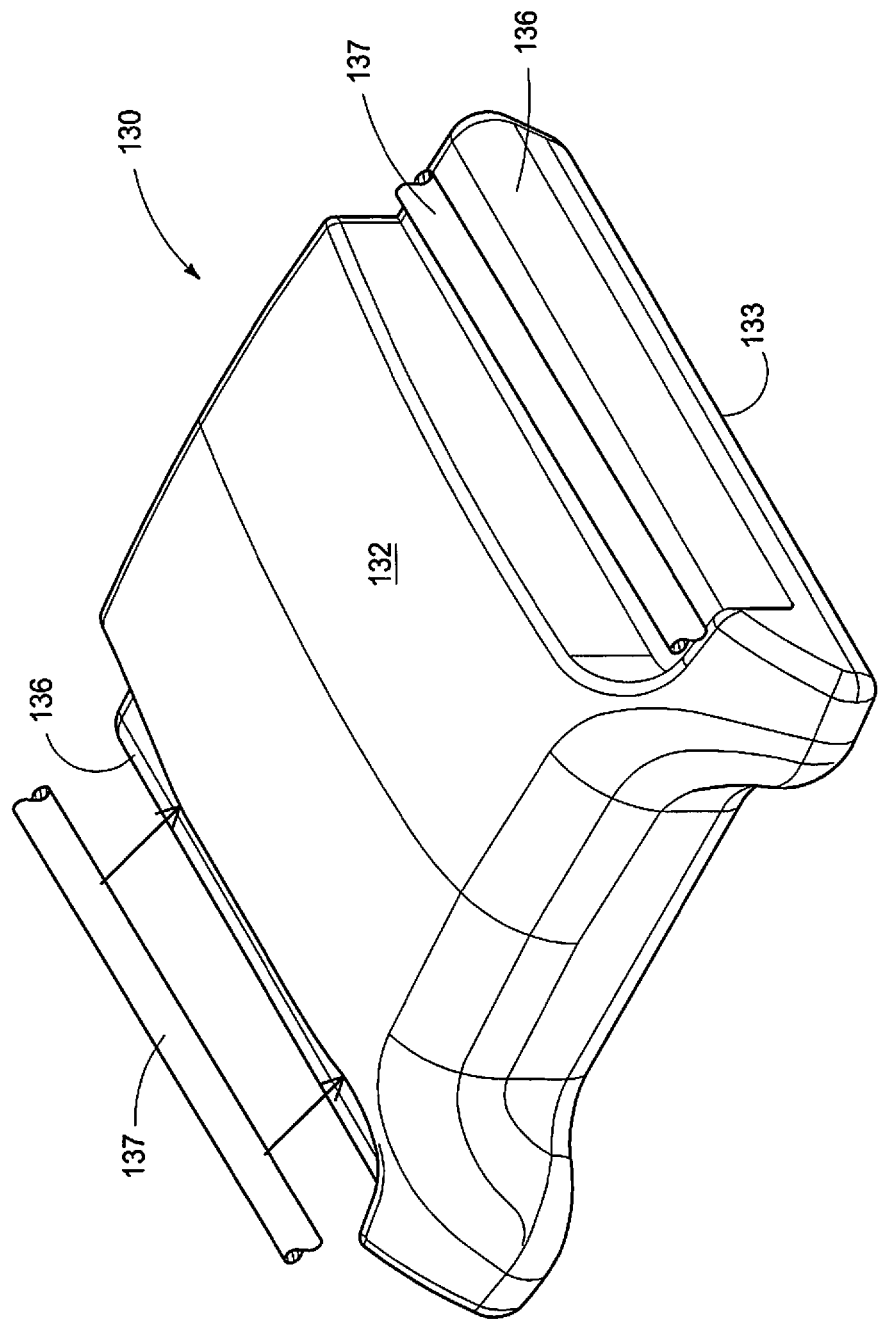
FIG. 22 is a greatly enlarged, perspective, anterior facing view of a moveable gate which forms a feature of the present invention.

The new orthodontic bracket 10 of the present invention, and as seen in FIG. 4, and following, has an anterior facing surface 120 which is positioned anteriorly, outwardly, relative to the pad 104. The anterior facing surface 120 is oriented along a given, anterior facing plane, and which is indicated by the line labeled 121. As can be readily observed, the bracket body 110 of the new invention 10, mounts a moveable gate 130 which is best seen in FIG. 22. The moveable gate is formed of a main body 131, which has an anterior facing surface 132, and which further lies substantially, and generally along or parallel to the plane 121. Still further the moveable gate 130 has an opposite, posterior facing surface 133, which forms, at least in part, a portion of the archwire slot which will be discussed in further detail, below. As seen in FIG. 6, the gate 130 is moveable between a first occluding position 134, which releasably secures an archwire as will be discussed hereinafter, in the archwire slot, and a second, non-occluding position 135 (shown in phantom lines), and which further allows the archwire to be inserted or removed from the archwire slot 140. The moveable gate 130, as seen in FIG. 22, has opposite peripheral edges 136, which slideably cooperate with the bracket body 110. In the fabrication of the prior art orthodontic brackets 11, as earlier discussed, some in-and-out movement or "play" was allowed for, or existed in the moveable gate 40 due to the manufacturing process. However, such movement or "play" in the moveable gate 130 would be detrimental because the resulting cross-sectional shape of the archwire slot, as will be discussed below, is important to the function of the present orthodontic bracket 10. In the present invention, therefore, the moveable gate 130 (FIG. 22) further comprises individual ribs 137 which are mounted, or made integral with, the anterior facing surface 132, and are further disposed in substantially parallel, spaced relation relative to the opposite peripheral edges 136. The ribs 137 are positioned to slideably, and matingly engage the bracket body 110. The individual ribs 137 maintain the moveable gate 130 in a substantially consistent angular orientation relative to the bracket body 110, so as to maintain the predetermined quadrilateral shape of the archwire slot as will be discussed, below. The ribs 137 are typically fabricated from the same material as the moveable gate 130. However, other materials can be selected, and which will achieve the same functional objectives as are discussed, below.

The archwire slot 140 is seen in the several forms of the invention 101 and 103 respectively. It is important to note that the archwire slot 140 as seen in the several forms of the invention as illustrated in FIGS. 4 and 6 are not individually symmetrically or coaxially oriented relative to the bracket body 110. Further, it will be seen that the archwire slot 140, as seen in FIGS. 4 and 6, is not perpendicularly oriented relative to the anterior facing plane 121. This is quite different than prior art orthodontic brackets as seen in FIGS. 1-3. The archwire slot 140, which is defined by or formed in the bracket body 110, is variously angled, or oriented relative to the bracket body 110, during fabrication, so as to impart to the given form of the invention 10, an ability for that particular form of the orthodontic bracket 10 to produce, or effect a high torque couple (FIG. 4); or a low torque couple (FIG. 6). A neutral or no torque expression is provided by a prior art at self-ligating orthodontic bracket 11 (FIG. 5) when it cooperates with an archwire. This new orthodontic bracket design 10 is fabricated to impart a given amount of torque by way of the transmission of the torque to the anterior facing surface 120, of the bracket body 110, and which effects the first, second and third order movement of the patient's tooth 12, but simultaneously maintains the bracket body 110, and the anterior facing surface 120, in the same orientation relative to the tooth 12 so that a patient utilizing same will not sense any variation in the surface texture or mouth feel of the anterior facing surface 120 of the orthodontic bracket 10 as it lies or rests against the inside surface of the lips of the patient. This is very much in contrast to the prior art self-ligating orthodontic brackets 11, as seen in FIGS. 1-3, and where torque is expressed or transmitted through the base or pad 16, and the anterior facing surfaces 30 of these respective prior art orthodontic brackets 11 are oriented in very different anterior facing planes 31. Therefore one aspect of the present invention 10 relates to an orthodontic bracket and where the torque is expressed in the face 120 or the bracket body 110. This, of course is in contrast to the prior art, as seen in FIGS. 1-3, and where the torque is expressed or transmitted to the base or pad 16. As seen in FIGS. 16 through 19 respectively, the archwire slot 140 can be angled or defined, during fabrication, to various degrees both, above and below, a horizontal plane. FIGS. 16 through 19 show various assorted angled archwire slots, all of which can individually express a high torque couple. However, these are representative examples of only a small number of the possible angled orientations that can be fabricated. Similarly, low torqueing couples can be fabricated having archwire slots which are angled to lie below a horizontal plane, and in an amount which is equal to what is seen in FIGS. 16 through 19. These possible operable orientations or angulations for the archwire slot 140 are representative only. These do not represent the upper and lower ranges of the angular orientations of the archwire slot 140 for which an orthodontic bracket 10, can be fabricated to impart the torque desired, and which is effective to cause the tooth movement as may be selected by a clinician to address a malocclusion.

The archwire slot 140 is defined, at least in part, by a superior, inwardly facing surface 141 which is formed from, or in the bracket body 110; and an opposite, spaced, inferior facing surface 142 of the same bracket body 110. These aforementioned surfaces are substantially parallel to each other. Still further, the archwire slot 140 is defined, at least in part, by a posterior, inwardly facing surface of the bracket body 143, and which is further disposed in parallel, spaced relation relative to the posterior facing surface 133 of the moveable gate 130. The archwire slot 140 has a generally, cross-sectional, quadrilateral shape which is defined by four angles 145, which are not right angles. At least some of the angles 145 have rounded corners which are generally indicated by the numeral 146. These rounded corners have a given curvature or radius which enhances the strength of the bracket body 110. In one possible form of the invention, the cross-sectional shape of the archwire slot 144 may take on the form of a parallelogram, and in another possible form of the invention, the cross-sectional shape of the archwire slot may take on the shape of a rhomboid. For purposes of this patent application, the definition of a parallelogram includes a structure or shape having opposite pairs of substantially parallel sides, and wherein the opposite pairs of parallel sides are each of substantially equal length. On the other hand, a rhomboid shape includes structures or shapes which have opposite pairs of sides that are substantially parallel in orientation, but the opposite pairs of sides each have different lengths. The center 147 of the archwire slot 140 is aligned with level archwire slot line-up 180, as seen in FIGS. 10-12.

Figure 21:
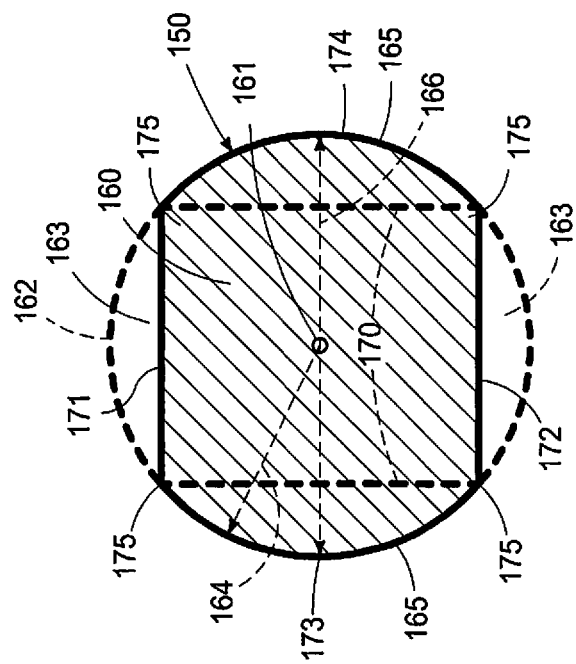
FIG. 21 is a greatly enlarged, transverse, vertical sectional view taken through the new archwire which is described in the present application.

Referring now to FIGS. 13-19 and 21 of the drawings, the archwire 150 which finds particular usefulness in the present orthodontic bracket 10, and with the orthodontic bracket as seen in U.S. Pat. No. 9,198,740, is illustrated. This new archwire 150, again, is fully disclosed in U.S. patent Ser. No. 14/976,074, the teachings of which are incorporated by reference herein, and from which this present patent application claims priority. In the drawings as provided in the aforementioned application, the archwire 150 of the present invention 10 is shown in a greatly enlarged cross-sectional view in FIG. 21. In this regard the archwire 150 has a circular-square or circular-rectangular cross-sectionally shaped main body 160. The circular-square or circular-rectangular cross-sectionally shaped main body 160 is resilient, and defined, at least in part, by a longitudinal axis, and which is generally indicated by the numeral 161. It should be understood that the circular-square, or circular-rectangular shaped main body 160 is originally formed from a circular, cross-sectionally shaped archwire 162 (illustrated in phantom lines) by a fabrication technique which removes a portion of the outside facing surface 163, of the circular, cross-sectionally shaped archwire 162. The removed portion of the previous circular shaped archwire 162, again, is shown in phantom lines in FIG. 21. The main body 160 has a radial dimension 164 which, in one form of the invention, may remain constant when measured from the longitudinal axis 161 to the curved outwardly facing surfaces 165 of the main body 160, and further has a width dimension 166, and which is measured along a line which extends through the longitudinal axis, and between the convexly curved outwardly facing surfaces 165. As seen in the drawings, the circular-square or circular-rectangular shaped main body 160 of the new archwire 150 has a thickness dimension 170 which is measured between the substantially planar, and parallel oriented superior and inferior facing surfaces 171 and 172, respectively. Further, the main body 160 includes a first, convexly curved posterior facing surface 173, and a second, convexly curved anterior facing surface 174. The pair of convexly curved surfaces 173 and 174, respectively, join the superior and inferior facing surfaces 171 and 172, at discreet angular edges or regions, and which are generally indicated by the numeral 175. As will be understood from a study of FIG. 21, the respective parallel, superior and inferior facing surfaces 171 and 172, respectively, each have a width dimension which is less than the width dimension 166 when measured along the line extending between the posterior and anterior outwardly facing curved surfaces 173 and 174, respectively. This reduced width dimension is measured across the superior and inferior facing surfaces 171 and 172, and between the angular edges or regions 175, and which form, at least in part, the peripheral edge of the superior and inferior surfaces. The outwardly curved surfaces 173, and 174 allows, or otherwise enables a clinician to maintain consistent first order movement of a patient's tooth 12 while simultaneously allowing the clinician to adjustably apply a different amount of force to the orthodontic bracket 10, and thereby achieving a clinician selectable, and controllable, second and third order of movements which are fully described in the aforementioned U.S. patent application, the teachings of which are incorporated by reference herein. The superior and inferior facing surfaces 171 and 172, respectively, of the archwire 150, is subsequently machined into the shape as seen in FIG. 21. The posterior and anterior curved surfaces 173, and 174 each have a given curvature which is greater than the curvature or radius as expressed by the rounded corners 146, and which define, at least in part, a portion of the archwire slot 140.

As discussed more fully in the earlier pending U.S. patent application, the unique and novel shape of the circular square, or circular rectangular shaped main body 160 allows a wide range of torqueing couples to be established but further substantially eliminates the earlier perceived problems associated with using a larger rectangular shaped archwire which can frictionally engage, and then impede the movement or travel of the moveable gate 130 to an occluding position 134, or the longitudinal movement of the bracket body 110 along the length of the archwire 150.

As seen in FIGS. 4-6, 23A-C, and 24A-C respectively, the present orthodontic bracket 10 construction, as well as the varied angled orientations of the archwire slot 140, allows an orthodontic bracket 10 to be produced which allows or facilitates a level archwire slot lineup, as indicated by the line labeled 180, to be easily achieved notwithstanding that the form of the orthodontic bracket, as fabricated, and which is being employed, is exerting a high torque couple, (FIG. 4), or a low torque couple, (FIG. 6). As earlier noted, this level archwire slot lineup 180 is nearly impossible to achieve when using the prior art passive self-ligation orthodontic brackets 11 as seen in FIGS. 1, 2 and 3, respectively. Still further, the new orthodontic bracket 10, in one form, allows adjacent orthodontic brackets placed on adjacent teeth 12 of the patient to be substantially vertically aligned as indicated by the lines labeled 185 (FIGS. 23A-C). In another possible, and second form of the invention as seen in FIGS. 24A-C, the bracket body 110 is affixed or made integral with the pad 104 such that when the orthodontic bracket 10 is placed on the patient's tooth 12, the bracket body 110, and the pad 104 are both substantially aligned with the longitudinal axis 13A of the patient's tooth 12. In this form of the invention the orthodontic brackets 10 are not vertically aligned as seen in FIGS. 23A-C, respectively. However, the level archwire slot line-up 180 is maintained. This alternative form of the invention provides still further treatment options for a clinician. The angulated bracket body 110 as seen in FIGS. 24A-C are indicated by the lines labeled 186. As was earlier discussed, and because the archwire slot 25 lineup of the prior art orthodontic brackets 11 were nearly impossible to achieve, some bending or other physical manipulation of the archwire 60 or 70 was required to properly place the selected archwire within the archwire slot 25, and then close the accompanying and adjacent gate 40. The present orthodontic bracket 10 completely avoids these previously identified problems, and allows the archwire 150 to be inserted within the archwire slot 140 with either no bending, or with only minimal bending so as to appropriately place it within the archwire slot 140, and thereafter permits the moveable gate 130 to be moved into the appropriate occluding position 134, as depicted in FIGS. 10-12, 23A-C, and 24A-C, respectively. The present orthodontic 10, therefore, addresses several of the more significant clinical objections, and obstacles which are often raised by clinicians to the use of the prior art passive self-ligation orthodontic brackets as depicted in FIGS. 1, 2 and 3. These perceived objections were related to the inability to achieve a level archwire slot lineup without substantial archwire (60 or 70) bending taking place; and further it provides a substantially constant dimensioned tie wing spacing 115 so as to allow clinicians enough space to place, or utilize, C-chains, elastic bands, and the like. Additionally, the anterior facing surface 120 of the new orthodontic brackets 10 lies within the same anterior facing plane 121 so that the comfort of the orthodontic bracket 10, when worn by a patient, is greatly improved, and the vertical alignment 185 of the adjacent orthodontic brackets 10, in one form of the invention, remains substantially the same. Further, this similar anterior facing surface 120, as seen in FIGS. 23A-C, and 24A-C assists a clinician in achieving a visual level archwire slot lineup 180 which further contributes to the easy placement of the archwire 150, within the archwire slot 140 with no archwire bending. Finally, greatly improved patient oral hygiene, and shorter orthodontic treatment periods are now possible.

As seen in FIG. 16 through 19, respectively, various cross-sectional shapes 144, and angular orientations of the archwire slot 140, and which takes on the shape of either a parallelogram or a rhomboid is shown. The various angular orientations of the parallelogram 144 are illustrated by reference to a horizontal line of reference which is generally indicated by the numeral 190. These angular orientations of the archwire slot 140, which are located above the horizontal line of reference, vary, as illustrated, from about 3 degrees to 13 degrees, respectively. These are only representative examples of the possible angular orientations that may be achieved for both the archwire slot angular orientations which lies above, or below, the horizontal line of reference 190. Angular orientations located below the line of reference would, of course, be employed to express low torque couples when an archwire 150 is received within the archwire slot 140. To achieve a neutral or standard couple a prior art self-litigating orthodontic bracket 11 (FIG. 5) would be employed. Of course, when a clinician is employing the new orthodontic bracket 10, the clinician may select various different torque couples for adjacent teeth. Both high torque couples, (FIGS. 16-19) and low torque couples (FIG. 6), or even a neutral or no torque as seen in FIG. 5, can be selected. The engagement of the archwire 150, with the bracket body 110, is indicated by the arrows labeled 200 (FIGS. 10-12 respectively). This shows how the torque is imparted to the bracket body 110 by way of the anterior facing surface 120. However, when placing the orthodontic bracket 10 on the patient's teeth the clinician can typically achieve a substantially uniform, aligned and level archwire slot lineup 180 which will result in the archwire 150 being placed or oriented within the archwire slot 140 with no bending or other only minor manipulation. Therefore, biologically gentle, and appropriate, physical forces can be applied to the patient's teeth 12 during an orthodontic treatment period in a manner not possible, heretofore, and which allows a clinician to achieve a desired first, second and/or third order movement, and outstanding clinical results, with minimal, and usually shorter patient treatment times.

OPERATION

The operation of the described embodiments of the present invention are believed to be readily apparent, and are briefly summarized at this point.

The present invention, when utilized in combination with the orthodontic bracket which is disclosed in the teachings as found in U.S. Pat. No. 9,198,740; and pending patent application Ser. No. 14/976,074, and from which the present application claims priority, provides an overall orthodontic treatment system for clinicians, and which has not been possible with the prior art devices, and other appliances which have been available to the profession over the last several decades. The combination of the orthodontic bracket as shown in the aforementioned patent, and the use of the new archwire as depicted, and which is more fully discussed in the early pending U.S. application, allows clinicians to effectively treat multiple maloccluded teeth with increased confidence, and further achieve desired tooth movements with minimal treatment times, and greater results for the patient.

In its broadest aspect the present inventions relates to an orthodontic bracket 10 which includes a bracket body 110 which is releasably affixed to an anterior facing surface 13 of a patient's tooth 12, and which further has an anterior facing surface 120, and wherein the bracket body defines an archwire slot 140 which is oriented in a predetermined angular orientation relative to the bracket body 110, and which further receives, and cooperates with an archwire 150 having a predetermined cross-sectional shape, and wherein the archwire 150 expresses a predetermined amount of torque to the anterior facing surface 120 of the bracket body 110 to effect a clinician selected first, second or third order of movement of the patient's tooth 12, and wherein the orthodontic bracket 10, when used with other orthodontic brackets 10 of similar design, and which are positioned on adjacent teeth of the patient, produce a center, level archwire slot line-up 180, and wherein the archwire 150 is received within the center, level archwire slot line-up 180 of the respective orthodontic brackets 10 with no substantial bending notwithstanding that the adjacent orthodontic brackets 10 effect different first, second or third order movements to the adjacent teeth 12. In one form of the invention the adjacent orthodontic brackets 10 on the patients teeth 12 remain substantially vertically aligned or oriented as indicated by the lines labeled 185 (FIGS. 23A-C respectively). In another form of the invention as seen in FIGS. 24A-C the bracket body 110 and the pad 104 remain substantially aligned 186 relative to the longitudinal axis 13A of each of the patient's teeth 12 while simultaneously maintaining a level archwire slot line-up 180.

Another aspect the present invention relates to an orthodontic bracket 10 which includes a bracket body 110 which is releasably affixed to the anterior facing surface 13 of a patient's tooth 12. The bracket body 110 further defines an archwire slot 140 for receiving and cooperating with an archwire 150 having a given shape. The bracket body 110 further has an anterior facing surface 120 which is oriented along a given plane 121. A tie wing space or gap 115 is defined between the bracket body 110, and the patient's tooth 12, and further has a given, substantially constant dimension. The anterior facing surface 120 of the bracket body 110 remains oriented in the same plane, and the dimensions of tie wing space or gap 115 remains the same notwithstanding that the bracket body is rendered operable to impart first, second or third order movement to the patient's tooth 12.

As seen in the drawings, the archwire slot 140 of the new orthodontic bracket 10 has a cross-sectional, quadrilateral shape 144 which is defined, at least in part, by four angles 145, and which are not right angles. In one possible form of the invention the orthodontic bracket 10 defines an archwire slot 140 which has a cross-sectional shape which forms a parallelogram. In another possible form of the invention the orthodontic bracket 10 of the present invention defines an archwire slot 140 which has a cross-sectional shape which forms a rhomboid. In the arrangement as seen in the drawings, the orthodontic bracket 10 further includes a moveable gate 130 which has an anterior, and posterior facing surface 132 and 133, respectively, and which slideably cooperates with a bracket body 110, and further moves between an occluding and non-occluding position 134 and 135, respectively, relative to the archwire slot 140. The posterior facing surface 133 of the moveable gate 130 further defines, at least in part, a portion of the quadrilateral cross-sectional shape 144 of the archwire slot 140 when the moveable gate 130 is located in the occluding position 130 relative to the archwire slot 140. The anterior facing surface 132 of the moveable gate 130 lies generally along, or in parallel relation relative to the anterior facing plane 12, and which is defined by the anterior facing surface 120 of the bracket body 110.

The archwire slot 140, as defined by the orthodontic bracket 10, is angularly oriented relative to the bracket body 110, and is not perpendicularly oriented relative to the plane 121. Further, and when measured from a horizontal plane or line of reference 190, this angular orientation of the archwire slot 140 lies in a range which may be below, or above the horizontal line or reference or plane 190. Still further, the orthodontic bracket 10, when cooperating with the archwire 150, may impart a low torqueing couple (FIG. 6); or a high torqueing couple (FIG. 4). A neutral or no torqueing couple to the enclosed archwire 150 which is received within the archwire slot 14 can be effected by a prior art orthodontic bracket 11 (FIG. 5). The new invention 10 effects, at least in part, the first, second or third order movement to the patient's tooth 12.

The orthodontic bracket 10 of the present invention is further utilized, in combination, with an archwire 150 (FIG. 21) which has an elongated and resilient main body 160, and which is dimensioned to be received within the archwire slot 140 with no, or only with minimal bending, and which further has a circular-square or circular-rectangular cross-sectional shape (FIGS. 16-19). The resilient main body 160 of the archwire 150 has a predetermined, and selectively variable thickness dimension 170 which, when received in the archwire slot 140, and further cooperating with a bracket body 110, exerts a force which is based, at least in part, upon the thickness dimension of the resilient main body 160 of the archwire 150. The variable thickness dimension of the archwire 150 effects the first, second or third order movement of the patient's tooth 12 when cooperating with the bracket body 110. Additionally, the resilient main body 160 of the archwire 150 has a predetermined circumferential width dimension 166. The circumferential width dimension 166 maintains a consistent first order movement control of the patient tooth's 12 when the archwire 150 is cooperating with the bracket body 110. The variable thickness dimension 170 of the archwire 150 facilitates an adjustable application of force to the bracket body 110 so as to achieve a controllable second or third order movement of the patient's tooth 12. In the arrangement as seen in the drawings the archwire slot 140 as defined by the bracket body 110 has a height or thickness dimension when measured in a generally vertical direction. Further an increase in the height or thickness dimension 170 of the archwire 140 to greater than about 50% of the height dimension of the archwire slot 140 imparts an adjustable amount of torqueing force to the bracket body 110 so as to provide the selective second, or third order control of the patient's tooth during an orthodontic treatment regimen, yet due to the effect of the partial circular shape 165, of the archwire 150, an ideal first order rotation control of the patient's tooth 12 is maintained throughout the orthodontic treatment period.

More specifically, the present invention relates to an orthodontic bracket 10 which includes a pad 104 which is releasably affixed to an anterior facing surface 13 of a patient's tooth 12, and which further is undergoing an orthodontic treatment regimen. Additionally the orthodontic bracket 10 includes a bracket body 110 which is made integral with the pad 104, and which extends anteriorly outwardly relative to the pad. The bracket body 110 defines an archwire slot 140 for receiving and cooperating with an archwire 150 having a given shape. The archwire 150 when physically cooperating with the bracket body 110 transmits torque to the anterior facing surface 120 of the bracket body 150 so as to cause or effect a clinician selected first, second or third order movement of the patient's tooth 12. The archwire slot 140 has a cross-sectional quadrilateral shape 144 which is defined, in part, by four angles 145 which are not right angles.

Therefore, it will be seen that the orthodontic bracket 10 of the present invention provides many advantages over the prior art orthodontic brackets as seen in FIGS. 1, 2 and 3 respectively. The present orthodontic bracket 10 provides decreased treatment time for a patient, and further allows a clinician a means by which level archwire slot lineup 180 may be achieved in a manner not possible, heretofore. Further, the utilization of an archwire 150 of the present invention provides many advantages including that the archwire may be inserted with no or only minimal bending. Consequently, clinicians can achieve superior, and previously unattainable first, second and third order tooth control while simultaneously reducing patient treatment times in an amount not achievable by utilizing prior art appliances, and techniques known, heretofore.

In compliance with the statute the invention has been described in language more or less specific as to structural and methodical features. It is to be understood, however that the invention is not limited to the specific features shown and described since the means herein disclosed comprise preferred forms of putting the invention into effect. The invention, is therefore, claimed in any of its forms or modifications within the proper scope of the appended claims and appropriately interpreted in accordance with the Doctrine of Equivalence.

We claim:

1. A pair of passive self-ligating orthodontic brackets of a set of orthodontic brackets for treating a patient, the pair of passive self-ligating orthodontic brackets comprising:
   a first passive self-ligating orthodontic bracket comprising:
      a first pad that is configured to be releasably affixed to a first tooth;
      a first bracket body that extends from the first pad, the first bracket body or the first pad defining a first peripheral surface, the first bracket body having an anterior facing surface that defines a first anterior facing plane, a posterior surface, and a pair of opposing surfaces that extend from the posterior surface, the posterior surface and the pair of opposing surfaces defining a first archwire slot, the posterior surface being parallel to the first anterior facing plane, at least one of the pair of opposing surfaces forming a first non-perpendicular angle relative to the first anterior facing plane, and the first archwire slot being configured to receive an archwire; and
      a first gate that is coupled to the first bracket body and movable relative to the first archwire slot between a non-occluding position and an occluding position, in the occluding position, the first gate and the first archwire slot define a first lumen having a first axis; and
   a second passive self-ligating orthodontic bracket comprising:
      a second pad that is configured to be releasably affixed to a second tooth;
      a second bracket body that extends from the second pad, the second bracket body or the second pad defining a second peripheral surface, the second bracket body having an anterior facing surface that defines a second anterior facing plane, a posterior surface, and a pair of opposing surfaces that extend from the posterior surface, the posterior surface and the pair of opposing surfaces defining a second archwire slot, the posterior surface being parallel to the second anterior facing plane, at least one of the pair of opposing surfaces forming a second non-perpendicular angle relative to the anterior facing plane that is different than the first non-perpendicular angle, and the second archwire slot being configured to receive the archwire, and
      a second gate that is coupled to the second bracket body and movable relative to the second archwire slot between a non-occluding position and an occluding position, in the occluding position, the second gate and the second archwire slot define a second lumen having a second axis,
   wherein the first bracket body and the second bracket body are configured such that when the first axis and the second axis lay in the same plane, the first peripheral surface and the second peripheral surface are visually aligned with each other.

2. The pair of passive self-ligating orthodontic brackets of claim 1 wherein the first bracket body and the second bracket body each include a tie wing and a tie wing space is defined between the respective bracket body and the pad, and the tie wing space of the first bracket body is the same as the tie wing space on the second bracket body.

3. The pair of passive self-ligating orthodontic brackets of claim 1 wherein the first non-perpendicular angle is in the range of +3° and +13° and the second non-perpendicular angle is in the range of −3° and −13°.

4. The pair of passive self-ligating orthodontic brackets of claim 1 wherein the first lumen and the second lumen each have a cross-sectional shape which forms a parallelogram.

5. The pair of passive self-ligating orthodontic brackets of claim 1 wherein the first lumen and the second lumen each have a cross-sectional shape which forms a rhomboid.

6. The pair of passive self-ligating orthodontic brackets of claim 1 wherein each of the first gate and the second gate further comprise individual ribs mounted on an anterior facing surface of each of the gates, and which slidably engage the corresponding bracket body so as to maintain the angular orientation of the gate as it moves between the occluding and non-occluding position.

7. A system including the pair of passive self-ligating orthodontic brackets of claim 1 and an archwire, wherein the posterior surface and the first gate of the first passive self-ligating orthodontic bracket define a first slot width and the posterior surface and the second gate of the second passive self-ligating orthodontic bracket define a second slot width and the archwire comprises:
an elongated body having a first end, a second end extending therefrom, and a cross-sectional configuration having two opposing curved surfaces and two opposing planar surfaces, the two opposing curved surfaces define a largest cross-sectional dimension of the body and the two opposing planar surfaces define a thickness dimension of the body,
wherein the largest cross-sectional dimension and the thickness dimension are uniform from the first end to the second end and the largest cross-sectional dimension is substantially equal to the first slot width and substantially equal to the second slot width and when the archwire is in the first archwire slot and in the second archwire slot, the first gate and the second gate are each movable to the occluding position.

8. The pair of passive self-ligating orthodontic brackets of claim 1, wherein each one of the pair of opposing surfaces for each of the first bracket body and the second bracket body is parallel to the other.

9. The pair of passive self-ligating orthodontic brackets of claim 1, wherein the first gate and the second gate are each movable relative to the respective archwire slot in a direction that is parallel to the anterior facing plane.

10. The pair of passive self-ligating orthodontic brackets of claim 1, wherein the first bracket body has at least one superior tie wing and a superior tie wing gap is defined between the superior tie wing and the first pad, and the first bracket body has at least one inferior tie wing and an inferior tie wing gap is defined between the inferior tie wing and the first pad, the inferior tie wing gap equals the superior tie wing gap.

11. The pair of passive self-ligating orthodontic brackets of claim 1 wherein the first pad defines the first peripheral surface and the second pad defines the second peripheral surface so that alignment of the first and second peripheral surfaces of the respective pads aligns the first axis of the first lumen and the second axis of the second lumen.

12. The pair of passive self-ligating orthodontic brackets of claim 1 wherein the first bracket body includes a first tie wing that defines the first peripheral surface and the second bracket body includes a second tie wing that defines the second peripheral surface.

13. The pair of passive self-ligating orthodontic brackets of claim 1 wherein the first bracket body includes a first inferior tie wing that defines the first peripheral surface and the second bracket body includes a second inferior tie wing that defines the second peripheral surface.

14. The pair of passive self-ligating orthodontic brackets of claim 1 wherein the first bracket body includes a first superior tie wing that defines the first peripheral surface and the second bracket body includes a second superior tie wing that defines the second peripheral surface.

15. The pair of passive self-ligating orthodontic brackets of claim 1 wherein the difference between the first non-perpendicular angle and the second non-perpendicular angle is 6° or more.

16. A passive self-ligating orthodontic bracket for use with other passive self-ligating orthodontic brackets during orthodontic treatment, each of the other passive self-ligating orthodontic brackets including an archwire slot for receiving an archwire, the passive self-ligating orthodontic bracket comprising:
a bracket body configured to be releasably affixed to a tooth and having an archwire slot configured to receive the archwire, the archwire slot not being symmetrically or coaxially oriented relative to the bracket body; and
a gate coupled to the bracket body and movable between a non-occluding position and an occluding position, in the occluding position, the gate and the archwire slot define a lumen having an axis,
wherein the bracket body is configured to be mounted to a tooth with a peripheral portion of the bracket body visually aligned with a corresponding peripheral portion of an adjacent bracket body on an adjacent tooth such that the axis of the lumen of the archwire slot is positioned in a plane defined by an axis of a lumen of the adjacent archwire slot of the adjacent bracket body,
wherein the bracket body defines an anterior facing plane and the archwire slot includes a posterior surface and a pair of opposing surfaces extend from the posterior-surface, the posterior surface is parallel to the anterior facing plane, and
wherein at least one of the pair of opposing surfaces forms a non-perpendicular angle relative to the anterior facing plane.

17. The passive self-ligating orthodontic bracket of claim 16 wherein the anterior facing plane is perpendicular to the plane defined by the axis of the lumen.

18. The passive self-ligating orthodontic bracket of claim 16 wherein the gate is movable in a direction perpendicular to the plane defined by the axis of the lumen.

19. The passive self-ligating orthodontic bracket of claim 16 wherein the non-perpendicular angle is 3° or more from perpendicular.

20. The passive self-ligating orthodontic bracket of claim 16 wherein the posterior surface is perpendicular to the plane defined by the axis of the lumen.

21. A system for orthodontic treatment comprising:
a passive self-ligating orthodontic bracket for use with an archwire during orthodontic treatment, the passive self-ligating orthodontic bracket comprising:
a bracket body configured to be releasably affixed to a tooth, the bracket body having an anterior facing surface defining an anterior facing plane, a posterior surface, and a pair of opposing surfaces that extend from the posterior surface, at least one of the opposing surfaces forming a non-perpendicular angle with the anterior facing surface, the posterior surface and the pair of opposing surfaces defining an archwire slot configured to receive the archwire; and a gate coupled to the bracket body and having a posterior facing surface, the gate being movable between a non-occluding position and an occluding position, in the occluding position, the posterior facing surface faces and is parallel to the posterior surface of the archwire slot, wherein a slot width is defined from the posterior facing surface to the posterior surface; and an archwire comprising an elongated body having a cross-sectional configuration having two opposing curved surfaces and two opposing planar surfaces, the two opposing curved surfaces define a largest cross-sectional dimension of the body and the two opposing planar surfaces define a thickness dimension of the body, wherein the largest cross-sectional dimension is substantially equal to the slot width.

22. The system of claim 21 wherein the pair of opposing surfaces are parallel to one another.

23. The system of claim 21 wherein the bracket body is configured to provide one of a high torque couple or a low torque couple to the patient's tooth during treatment.

24. The system of claim 21 further comprising:

a pair of passive self-ligating orthodontic brackets including a first passive self-ligating orthodontic bracket that is the passive self-ligating orthodontic bracket of claim 21 and a second passive self-ligating orthodontic bracket for use with the archwire, the second passive self-ligating orthodontic bracket comprising:

a second bracket body configured to be releasably affixed to a tooth, the second bracket body having a second anterior facing surface, a second posterior surface, and a second pair of opposing surfaces that extend from the second posterior surface, at least one of the second opposing surfaces forming a second non-perpendicular angle with the second anterior facing surface, the second posterior surface and the second pair of opposing surfaces defining a second archwire slot configured to receive the archwire; and a second gate coupled to the second bracket body and having a second posterior facing surface, the second gate being movable between a non-occluding position and an occluding position, in the occluding position, the second posterior facing surface faces and is parallel to the second posterior surface, wherein the second non-perpendicular angle is different from the non-perpendicular angle of the first self-ligating orthodontic bracket and the anterior facing surface of the first passive self-ligating orthodontic bracket is configured to be in an identical orientation as the second anterior facing surface relative to a tooth.

25. The system of claim 21 wherein the posterior surface is parallel to the anterior facing surface.

* * * * *

UNITED STATES PATENT AND TRADEMARK OFFICE
CERTIFICATE OF CORRECTION

| | |
|---|---|
| PATENT NO. | : 11,179,226 B2 |
| APPLICATION NO. | : 15/271894 |
| DATED | : November 23, 2021 |
| INVENTOR(S) | : Paul L. Damon et al. |

It is certified that error appears in the above-identified patent and that said Letters Patent is hereby corrected as shown below:

In the Specification

Column 2, Lines 18-20, "Still further, the orientation of the bracket body on the pad of these prior art ... were such that the tie" should be --Still further, the orientation of the bracket body on the pad of these prior art ... was such that the tie--.

Column 2, Lines 66-67, "In fact, the aforementioned shortcomings has been one of the major objections of" should be --In fact, the aforementioned shortcomings have been one of the major objections of--.

Column 7, Lines 24-25, "understood that the lines labeled ..., and which further extend across FIGS. 1-3, represents imaginary" should be --understood that the lines labeled ..., and which further extend across FIGS. 1-3, represent imaginary--.

Column 8, Lines 37-39, "The first, second and third forms 21, 22 and 23 of the prior art passive, self-ligation orthodontic brackets as seen in ..., each has an anterior facing" should be --The first, second and third forms 21, 22 and 23 of the prior art passive, self-ligation orthodontic brackets as seen in ..., each have an anterior facing--.

Column 8, Lines 44-46, "forms of the prior art orthodontic brackets 11, when expressing ... each has an anterior facing surface 30 which" should be --forms of the prior art orthodontic brackets 11, when expressing ... each have an anterior facing surface 30 which--.

Column 9, Lines 61-64, "As seen in FIGS. 1 and 3, the archwire slot 25 of these prior art orthodontic brackets 11 move vertically to express the different desired torques which is then transmitted through" should be --As seen in FIGS. 1 and 3, the archwire slot 25 of these prior art orthodontic brackets 11 move vertically to express the different desired torques which are then transmitted through--.

Column 10, Line 47, "creates other problems inasmuch as reducing the size, of the" should be --creates other problems inasmuch as reducing the size of the--.

Column 12, Lines 11-13, "In another form of ..., as seen in ..., each bracket body 110 of the invention are manufactured or formed in a manner" should be --In another form of ..., as seen in ..., each bracket body 110 of the invention is manufactured or formed in a manner--.

Column 13, Lines 25-26, "that the archwire slot 140 as seen in the several forms of the invention as illustrated in ... are not individually" should be --that the archwire slots 140 as seen in the several forms of the invention as illustrated in ... are not individually--.

Signed and Sealed this
Fifth Day of July, 2022

*Katherine Kelly Vidal*

Katherine Kelly Vidal
*Director of the United States Patent and Trademark Office*

Column 13, Line 39, "provided by a prior art at self-ligating orthodontic bracket 11" should be --provided by a prior art self-ligating orthodontic bracket 11--.

Column 15, Lines 27-28, "The outwardly curved surfaces 173, and 174 allows, or otherwise enables a clinician" should be --The outwardly curved surfaces 173, and 174 allow, or otherwise enable a clinician--.

Column 15, Lines 36-38, "The superior and inferior facing surfaces 171 and 172, respectively, of the archwire 150, is subsequently machined into the shape" should be --The superior and inferior facing surfaces 171 and 172, respectively, of the archwire 150, are subsequently machined into the shape--.

Column 15, Lines 44-45, "application, the unique and novel shape of the circular square, or circular rectangular shaped main body 160 allows" should be --application, the unique and novel shape of the circular-square, or circular-rectangular shaped main body 160 allows--.

Column 16, Lines 12-13, "The angulated bracket body 110 as seen in FIGS. 24A-C are indicated by the lines" should be --The angulated bracket body 110 as seen in FIGS. 24A-C is indicated by the lines--.

Column 16, Lines 13-15, "As was earlier discussed, and because the archwire slot 25 lineup of the prior art orthodontic brackets 11 were nearly impossible to" should be --As was earlier discussed, and because the archwire slot 25 line-up of the prior art orthodontic brackets 11 was nearly impossible to--.

Column 16, Line 27, "The present orthodontic 10, therefore, addresses several of" should be --The present orthodontic bracket 10, therefore, addresses several of--.

Column 16, Line 32, "the inability to achieve a level archwire slot lineup without" should be --the inability to achieve a level archwire slot line-up without--.

Column 16, Line 45, "visual level archwire slot lineup 180 which further" should be --visual level archwire slot line-up 180 which further--.

Column 16, Lines 50-53, "As seen in FIG. 16 through 19, ..., various ... shapes 144, and angular orientations of the ... is shown." should be --As seen in FIG. 16 through 19, ..., various ... shapes 144, and angular orientations of the ... are shown.--.

Column 16, Lines 61-62, "achieved for both the archwire slot angular orientations which lies above, or below," should be --achieved for both the archwire slot angular orientations which lie above, or below,--.

Column 17, Line 12, "aligned and level archwire slot lineup 180" should be --aligned and level archwire slot line-up 180--.

Column 17, Line 25, "The operation of the described embodiments of the present invention are believed to be" should be --The operations of the described embodiments of the present invention are believed to be--.

Column 17, Line 66, "adjacent orthodontic brackets 10 on the patients teeth 12" should be --adjacent orthodontic brackets 10 on the patient's teeth 12--.

Column 18, Line 7, "Another aspect the present invention relates to an" should be --Another aspect of the present invention relates to an--.

Column 18, Line 19, "dimensions of tie wing space or gap 115 remains the same" should be --dimensions of tie wing space or gap 115 remain the same--.

Column 19, Line 54, "clinician a means by which level archwire slot lineup 180" should be --clinician a means by which level archwire slot line-up 180--.

Column 20, Lines 2-3, "The invention, is therefore, claimed in any of its forms or" should be --The invention is, therefore, claimed in any of its forms or--.